United States Patent
Wang et al.

(10) Patent No.: US 11,544,542 B2
(45) Date of Patent: Jan. 3, 2023

(54) COMPUTING DEVICE AND METHOD

(71) Applicant: Shanghai Cambricon Information Technology Co., Ltd., Pudong New Area (CN)

(72) Inventors: Zai Wang, Pudong New Area (CN); Shengyuan Zhou, Pudong New Area (CN); Zidong Du, Pudong New Area (CN); Tianshi Chen, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 532 days.

(21) Appl. No.: 16/698,976

(22) Filed: Nov. 28, 2019

(65) Prior Publication Data

US 2020/0110988 A1 Apr. 9, 2020

Related U.S. Application Data

(63) Continuation-in-part of application No. PCT/CN2018/090901, filed on Jun. 12, 2018.

(30) Foreign Application Priority Data

Jun. 13, 2017 (CN) .......................... 201710441977.0
Jun. 21, 2017 (CN) .......................... 201710473955.2
(Continued)

(51) Int. Cl.
*G06N 3/063* (2006.01)
*G06F 9/30* (2018.01)
(Continued)

(52) U.S. Cl.
CPC ........... *G06N 3/063* (2013.01); *G06F 9/3001* (2013.01); *G06F 9/30094* (2013.01);
(Continued)

(58) Field of Classification Search
CPC ................................ G06N 3/04; G06N 3/063
See application file for complete search history.

(56) References Cited

U.S. PATENT DOCUMENTS 7,836,284 B2 * 11/2010 Dockser ................ G06F 1/3287
712/43
2015/0242210 A1 * 8/2015 Kim ...................... G06F 9/3887
712/7
2018/0307980 A1 * 10/2018 Barik .................... G06N 3/0454

FOREIGN PATENT DOCUMENTS

CN 1838031 A 9/2006
CN 101854526 A 10/2010
(Continued)

OTHER PUBLICATIONS

CN 201710441977.0, Official Action dated Apr. 7, 2020, 8 pages.
(Continued)

*Primary Examiner* — Michael J Metzger
(74) *Attorney, Agent, or Firm* — Getech Law LLC; Jun Ye

(57) ABSTRACT

A computing device, comprising: a computing module, comprising one or more computing units; and a control module, comprising a computing control unit, and used for controlling shutdown of the computing unit of the computing module according to a determining condition. Also provided is a computing method. The computing device and method have the advantages of low power consumption and high flexibility, and can be combined with the upgrading mode of software, thereby further increasing the computing speed, reducing the computing amount, and reducing the computing power consumption of an accelerator.

19 Claims, 12 Drawing Sheets

(30) Foreign Application Priority Data

| | | | |
|---|---|---|---|
| Jun. 21, 2017 | (CN) | .......................... | 201710474297.9 |
| Jun. 22, 2017 | (CN) | .......................... | 201710483182.6 |
| Jun. 26, 2017 | (CN) | .......................... | 201710495795.1 |

(51) Int. Cl.
    *G06N 3/04*         (2006.01)
    *G06N 3/02*         (2006.01)
    *G06V 10/70*       (2022.01)

(52) U.S. Cl.
    CPC ........... *G06F 9/30145* (2013.01); *G06N 3/02* (2013.01); *G06N 3/04* (2013.01); *G06V 10/70* (2022.01)

(56) References Cited

FOREIGN PATENT DOCUMENTS

| | | |
|---|---|---|
| CN | 104539263 A | 4/2015 |
| CN | 105320495 A | 2/2016 |
| CN | 105512723 A | 4/2016 |
| CN | 106779068 A | 5/2017 |
| CN | 106796668 A | 5/2017 |
| CN | 109086880 A | 12/2018 |

OTHER PUBLICATIONS

Shijin Zhang et al. "Cambricon-X: An Accelerator for Sparse Neural Networks"; 49th Annual IEEE/ACM International Symposium on Microarchitecture; University of Chinese Academy of Sciences, Beijing, China; Dec. 15, 2016, 12 pages.
EP19217768.1, European Search Report dated Apr. 24, 2020, 9 pages.
Alham Fikri Aji et al., "Sparse Communication for Distributed Gradient Descent", arxiv.org, Cornell University Library, 201 Olin Library Cornell University Ithaca, NY 14853, Apr. 17, 2017, 6 pages.
Wei Wen et al., "TernGrad: Ternary Gradients to Reduce Communication in Distributed Deep Learning", arxiv.org, Cornell University Library, 201 Olin Library Cornell University Ithaca, NY 14853, May 22, 2017, 13 pages.
PCT/CN2018/090901—Search Report, dated Aug. 21, 2018, 9 pages.
CN 201710441977.0—Second Office Action, dated Sep. 15, 2020, 9 pages.
CN 201710473955.2—First Office Action, dated Mar. 2, 2020, 3 pages. (No English Translation).
CN 201710473955.2—Second Office Action, dated May 15, 2020, 3 pages. (No English Translation).
CN 201710473955.2—Third Office Action, dated Aug. 24, 2020, 4 pages. (No English Translation).
CN 201710474297.9—First Office Action, dated May 15, 2020, 3 pages. (No English Translation).
CN 201710474297.9—Second Office Action, dated Nov. 12, 2020, 9 pages. (No English Translation).
CN 201710483182.6—First Office Action, dated Apr. 29, 2020, 9 pages. (no English Translation).
CN 201710495795.1—First Office Action, dated Dec. 30, 2019, 3 pages (no English Translation).
CN 201710495795.1—Second Office Action, dated Mar. 25, 2020, 4 pages. (no English Translation).
PCT/CN2018/090901—International Search Report, dated Aug. 27, 2018, 10 pages. (no English translation).
EP 18818258.8—Response to the Invitation to File Search Results Pursuant to Rule 70b(1) EPC dated Feb. 4, 2021, filed Feb. 18, 2021, 8 pages.
EP 18818258.8—Extended European Search Report, dated Jul. 21, 2020, 9 pages.
EP 18818258.8—Response to Extended European Search Report dated Jul. 21, 2020, dated Jan. 26, 2021, 14 pages.
Zhang, et al., "Power Optimization in Multipliers Using Multi-Precision Combined with Voltage Scaling Techniques", IEEE 1st Int'l Symposium on Quality Electronic Design—Asia, 2009, 4 pages.
Fayed, et al., "A Novel Architecture for Low-Power Design of Parallel Multipliers", Proceedings IEEE Computer Society Workshop on VLSI 2001. Emerging Technologies for VLSI Systems, 2001, pp. 149-154.
EP 19217768.1—Response to Extended European Search Report dated Apr. 24, 2020, dated Nov. 25, 2020, 11 pages.
EP 19217768.1—Response to Extended European Search Report dated Dec. 3, 2020, dated Jan. 29, 2021, 8 pages.

\* cited by examiner

COMPUTING DEVICE AND METHOD

RELATED DISCLOSURES

The present disclosure is a continuation-in-part of PCT Application No. PCT/CN2018/090901 with the title of "COMPUTING DEVICE AND METHOD" filed on Jun. 12, 2019, the content of which is incorporated herein by reference in its entirety.

The present disclosure claims the benefit and priority of Chinese Patent Application No. 201710441977.0 with the title of "COMPUTING DEVICE AND METHOD" filed on Jun. 13, 2017, the content of which is incorporated herein by reference in its entirety.

The present disclosure claims the benefit and priority of Chinese Patent Application No. 201710473955.2 with the title of "SPARSE TRAINING METHOD" filed on Jun. 21, 2017, the content of which is incorporated herein by reference in its entirety.

The present disclosure claims the benefit and priority of Chinese Patent Application No. 201710474297.9 with the title of "TRAINING DEVICE" filed on Jun. 21, 2017, the content of which is incorporated herein by reference in its entirety.

The present disclosure claims the benefit and priority of Chinese Patent Application No. 201710483182.6 with the title of "PROCESSOR, PROCESSING METHOD OF THE PROCESSOR, CHIP, CHIP PACKAGE STRUCTURE, AND ELECTRONIC DEVICE" filed on Jun. 22, 2017, the content of which is incorporated herein by reference in its entirety.

The present disclosure claims the benefit and priority of Chinese Patent Application No. 201710495795.1 with the title of "COMPUTING DEVICE AND METHOD" filed on Jun. 26, 2017, the content of which is incorporated herein by reference in its entirety.

TECHNICAL FIELD

The disclosure relates to the field of artificial intelligence, and specifically relates to an operation device and method.

BACKGROUND

As the foundation of many current artificial intelligence applications, deep neural networks have been applied in various fields such as speech recognition, image processing, data analysis, advertisement recommendation system, and automated driving, which is considered as a breakthrough. Deep neural networks have thus gained a growing presence in many aspects of human life. However, the large quantity of operations performed by deep neural networks have always been a constraint for their development speed and further applications. When considering adopting an accelerator to improve the operation speed of a deep neural network, the numerous operations would inevitably cause great energy consumption and overhead, and similarly, constrain the further application of the accelerator.

In the aspect of hardware, current and conventional accelerator architectures primarily perform targeted acceleration designs by analyzing the most time-consuming operation part in an operation process. Taking a convolutional neural network as an instance, as shown in FIG. 1, a current and conventional accelerator architecture for inner product operations often adopts a "multiply-add" structure. In other words, the accelerator architecture may obtain a group of products through a group of multipliers in a clock cycle, then perform parallel accumulation to obtain a final result. However, this architecture may lack flexibility and may fail to further improve the operation speed, nor can it reduce the quantity of operations.

SUMMARY

The present disclosure provides an operation device, where the operation device may include: an operation module that may include one or more operation units; and a control module that may include an operation control unit and may be configured to control shutdown of an operation unit of the operation module according to a determination condition. In an example of the disclosure, the determination condition may include a threshold determination condition or a function mapping determination condition.

In an example of the disclosure, the operation module may include a plurality of operation units, in which each of the operation units may include a temporary caching unit and one or more operation components. The operation component may include one or more of adder, multiplier, and selector.

In an example of the disclosure, the operation module may include n multipliers located at a first stage and an adder tree of n input located at a second stage, where n is a positive integer.

In an example of the disclosure, the determination condition may include a threshold determination condition or a function mapping determination condition.

In an example of the disclosure, the determination condition may be a threshold determination condition including: being less than a given threshold, being greater than a given threshold, being within a given value range, or being outside a given value range.

The present disclosure provides an operation method including: setting a determination condition, controlling shutdown of an operation unit of the operation module according to the determination condition.

In an example of the disclosure, the determination condition may include a threshold determination condition or a function mapping determination condition.

In an example of the disclosure, the determination condition may be a threshold determination condition including: being less than a given threshold, being greater than a given threshold, being within a given value range, or being outside a given value range.

In an example of the disclosure, the determination condition may be a function mapping determination condition, which in other words, refers to determining whether a given condition is satisfied after a function transformation is performed.

In an example of the disclosure, according to the determination condition, if the absolute value of input data to a multiplier is less than a given threshold, the multiplier may be shut down.

The operation device and method described above may have the following technical effects:

(1) differentiating data and reasonably determining whether to configure a corresponding part of the operation device according to the differences of data. For instance, a data processing part may be configured according to whether data is stored by means of sparse representation. For another instance, a count of operation groups and a count of multipliers and adders in each of the operation groups may be configured based on demands. Good flexibility may thus be achieved.

(2) satisfying the demand of shutting down corresponding multiplier and adder when data to be operated satisfy a given determination condition, so that the power consumption of an accelerator may be reduced while the operation speed of the accelerator remains unaffected.

The present disclosure provides a training device, where the training device may include: a data processing module configured to compress or expand input data; and an operation module connected to the data processing module for receiving data processed by the data processing module to perform operations.

In an example of the disclosure, the data processing module may include:

a data compression unit configured to compress input data according to a compression determination condition; and a data expansion unit configured to expand input data according to an expansion determination condition.

In an example of the disclosure, the data expansion unit may be configured to expand input data by expanding compressed sparse data into an uncompressed format.

In an example of the disclosure, the compression determination condition and the expansion determination condition may include a threshold determination condition or a function mapping determination condition.

In an example of the disclosure, the threshold determination condition may include: being less than a given threshold, being greater than a given threshold, being within a given value range, or being outside a given value range.

In an example of the disclosure, the data compression unit may screen and compress input data according to the sparse index values of the data to obtain data to be operated; or, make determination according to the values of data, and then screen and compress the input data to obtain data that satisfy the compression determination condition.

In an example of the disclosure, the data compression unit may screen and compress input neuron data according to the sparse index values of synaptic data to obtain neuron data to be operated, or screen and compress input synaptic data according to the sparse index values of neuron data to obtain synaptic data to be operated.

In an example of the disclosure, the data compression unit may compare the values of synapses with a given threshold, then screen and compress the synapses to obtain synaptic data of which the absolute value is not less than a given threshold, or compare the values of neurons with a given threshold, then screen and compress the neurons to obtain neuron data of which the absolute value is not less than the given threshold.

In an example of the disclosure, the data processing module may further be configured to determine whether to send a gradient and data to be operated to the operation module according to a gradient determination condition.

In an example of the disclosure, the gradient determination condition may include a threshold determination condition or a function mapping determination condition.

The training device described above may have the following technical effects.

It can be seen from the technical scheme above that the sparse training device of the disclosure may have at least one of the following technical effects:

(1) the sparse training device of the disclosure may be capable of effectively accelerating back training, which may greatly improve the speed of training and reduce the power consumption of training.

(2) the power consumption of training may be reduced through expanding or compressing data.

(3) meanwhile, the sparse training device of the disclosure may be capable of supporting forward inference of a sparse or dense neural network very well, and may thus be configured to accelerate the training process of an entire neural network.

(4) further improving the effectiveness and the speed of operation by adding a gradient determination condition and a zero-setting determination condition in back training.

The present disclosure provides a sparse training method, where the sparse training method may include:

selectively zeroing corresponding gradients of N neurons included at an $i^{th}$ layer of a neural network according to a zero-setting condition, where i represents an integer greater than 1, and N represents a positive integer; and performing training operations using gradients that are not zeroed to obtain updated gradients and synapses.

In an example of the disclosure, the zero-setting condition may include: a zero-setting probability condition, a zero-setting threshold condition, or a zero-setting percentage condition.

In an example of the disclosure, prior to zeroing corresponding gradients of selected neurons according to a zero-setting condition, the method may further include: screening N neurons included at the $i^{th}$ layer by adopting a random manner.

In an example of the disclosure, the random manner may include: Gaussian random, Bayesian probabilistic random, or systematic sampling.

In an example of the disclosure, the zero-setting condition may be a zero-setting probability condition, where the zero-setting probability is p. N*p neurons may be selected by adopting the random manner. Corresponding gradients of the N*p neurons may be set to zero.

In an example of the disclosure, the zero-setting condition may be a zero-setting threshold condition. The zero-setting threshold condition may include: being less than a given threshold, being greater than a given threshold, being within a given value range, or being outside a given value range.

In an example of the disclosure, the zero-setting threshold condition may be set as being less than a given threshold, where the given threshold is th. If a gradient is less than the given threshold th, the gradient may be set to zero; if the gradient is not less than the given threshold, the gradient may remain unchanged.

In an example of the disclosure, during a training process, the zero-setting threshold may be adjusted in a heuristic manner according to a heuristic condition.

In an example of the disclosure, the heuristic manner may include: performing tests by using test samples or verification samples, comparing result information of at least two tests among a plurality of tests, where the result information may include accuracy or loss.

In an example of the disclosure, an accuracy difference is obtained by comparing accuracy of a current test with accuracy of a previous test; or an accuracy difference is obtained by comparing accuracy of a current test with average accuracy of a plurality of previous tests.

The sparse training method described above may have the following technical effects.

It can be seen from the technical scheme above that the sparse training device of the disclosure may have at least one of the following technical effects:

(1) feedforward gradients of some neurons may be zeroed by adopting a certain method, so that the neurons may not transfer gradients during a second turn of back training, the quantity of operations may thus be reduced, and the operation speed may thus be accelerated.

(2) with the sparse training method of the disclosure, neurons may be zeroed by selecting a different method based on different user demands, and a percentage of zero-setting may be adjusted, thus having a certain degree of flexibility.

(3) the sparse training method of the disclosure may be applicable whether synapses are dense or sparse.

(4) the sparse training method of the disclosure may not affect normal operations and related improvements of a forward inference stage.

The present disclosure provides a processor, where the processor may include an instruction control unit and an operation module, where:

the instruction control unit may be configured to fetch a processing instruction and transfer the processing instruction to the operation module; and the operation module may be configured to receive frame information, neural network parameters, and the processing instruction, and perform neural network operations on the frame information and the neural network parameters according to the processing instruction.

In an example of the disclosure, the processor may further include:

a storage module configured to store the frame information and the neural network parameters, where the frame information may include complete frame information and reference frame information; and the neural network parameters may include neurons, weights, topological structures and/or processing instructions.

In an example of the disclosure, the operation module may include:

an accurate operation unit configured to fetch the complete frame information and weights in the neural network parameters, perform neural network operations to obtain a first operation result, and transfer the first operation result to the storage module; and an approximate operation unit configured to fetch the reference frame information and an operation result of the reference frame which may be obtained in advanced and stored in the storage module, then perform approximate operations to obtain a second operation result and transfer the second operation result to the storage module.

In an example of the disclosure, the neural network operations may include multiplication operations, addition operations, activation function operations, and/or pooling operations.

In an example of the disclosure, the accurate operation unit may include: a multiplier configured to perform the multiplication operations; and/or one or more adders configured to perform the addition operations; and/or an activation function unit configured to perform the activation function operations.

In an example of the disclosure, the adder tree may be consisted of one or more adders.

In an example of the disclosure, activation functions employed by the activation function operations may include sigmoid, tanh, ReLU, softmax, Leaky ReLU, and/or Maxout; the pooling operations may include mean-pooling, max-pooling, median-pooling, RoI pooling, and/or reverse pooling.

In an example of the disclosure, the processor may further include:

a decoding module configured to decompress a compressed video, fetch frame information from each frame in the video, then divide the frame information into complete frame information and reference frame information, and store the complete frame information and the reference frame information in the storage module.

In an example of the disclosure, the reference frame information may include reference frame information that refers to encoding of a previous frame and/or reference frame information that refers to encodings of a previous frame and a subsequent frame.

In an example of the disclosure, the decoding module may further be configured to assign a flag bit to each piece of frame information, where the complete frame information may be marked as I frame, the reference frame information that refers to encoding of a previous frame may be marked as P frame, and the reference frame information that refers to encodings of a previous frame and a subsequent frame may be marked as B frame.

The processor and data processing method described above may have the following technical effects:

(1) the processor of the disclosure may divide information of each frame in a video into complete frame information and reference frame information, and then perform accurate operations on the complete frame information (e.g., neural network operations), approximate operations on the reference frame information and an operation result of the reference frame obtained in advance. Thus, when a neural network processes a video, the quantity of operations performed by the neural network may thus be greatly decreased, the operation time may be reduced, and the power consumption may be cut down.

(2) the processor of the disclosure may efficiently rebuild the function of a neural network processor and greatly reduce the time spent on videos processing, thus, video data may be processed in real-time.

(3) the processor of the disclosure may be capable of fulfilling its function in an application environment with features of low memory and strong real-timeness, video processing may thus be further simplified and accelerated.

The present disclosure provides an operation device, where the operation device may include:

a transformation module configured to perform spatial transformation on input data and/or a parameter matrix from first geometric space into second geometric space; and an operation module connected to the transformation module, and may be configured to receive transformed input data and parameter matrix and then perform operations.

In an example of the disclosure, input data and a parameter matrix may be presented by employing a linear combination of a basis vector of second geometric space through spatial transformation. In other words, the input data and the parameter matrix may be expanded in the second geometric space.

In an example of the disclosure, the input data and the parameter matrix may be input data and a parameter matrix used by a convolutional layer, a down-sampling layer, a normalization layer, or a regularization layer.

In an example of the disclosure, the first geometric space may be a spatial domain, and the second geometric space may be a frequency domain.

In an example of the disclosure, the manner of the spatial transformation may be an invertible spatial transformation including FFT, DFT, DCT or DST.

The present disclosure provides an operation method, where the operation method may include:

performing spatial transformation on input data and/or a parameter matrix from first geometric space to second geometric space; and performing operations on the transformed input data and parameter matrix.

In an example of the disclosure, input data or parameter matrix may be presented by employing a linear combination of a basis vector of second geometric space through spatial transformation. In other words, the input data and parameter matrix may be expanded in the second geometric space.

In an example of the disclosure, the input data and the parameter matrix may be input data and a parameter matrix used by a convolutional layer, a down-sampling layer, a normalization layer, or a regularization layer.

In an example of the disclosure, the first geometric space may be a spatial domain, and the second geometric space may be a frequency domain.

In an example of the disclosure, the manner of the spatial transformation may be an invertible spatial transformation including FFT, DFT, DCT or DST.

The operation device and method described above may have the following technical effects:

(1) transferring operations of a neural network to another space for operating by decomposing the operations of the neural network, which may thus accelerate the speed of the initial neural network by performing a limited quantity of operations in another space.

(2) transferring data of a neural network to another space, which may thus reduce an amount of data in the neural network and cut down storage overhead.

(3) optimizing a parameter matrix and input data in a transformation space, which may thus further reduce the overhead and accelerate the operation speed.

DETAILED DESCRIPTION

Figure 1:
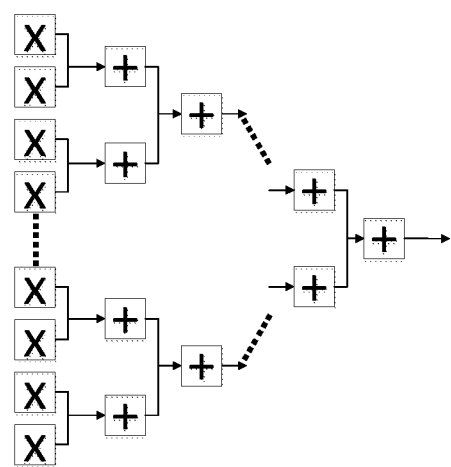
FIG. 1 is a structural diagram of an accelerator described in the background.

The present disclosure is explained more fully hereinafter with reference to specific examples and the accompanying drawings to facilitate a better understanding of the purposes, technical schemes and advantages of the disclosure.

It should be noted that in the description of the drawings or the specification, reference is made to the drawings, and the same reference numbers used designate the same or similar parts. The implementations that are not illustrated or described in the drawings are well-known to persons having ordinary skill in the art of the disclosure. Also, it should further be noted that, though instances including the parameters of specific values are provided herein, the parameters need not exactly equal the corresponding values. Instead, the parameters may approximates the corresponding values within an acceptable error tolerance or a design constraint. In addition, the location words used in the examples hereinafter, such as "up", "down", "front", "back", "left", "right", and the like, merely indicate the location in the reference drawings. Thereby, the location words used are not intended to limit the disclosure.

Unless otherwise defined, all technical and scientific terms used herein have the same meaning as commonly understood by persons having ordinary skill in the art of the disclosure. The terms used in the specification of the disclosure are merely for the purpose of describing specific examples and are not intended to limit the disclosure. The phrase "and/or" used herein refers to the random and all combinations of one or a plurality of related items listed.

Figure 2:
FIG. 2 is a structural diagram of an operation device in an example of the disclosure.

As shown in FIG. 2, an example of the disclosure provides an operation device, where the operation device may include: an operation module and a control module, where the operation module may include one or more operation units, and the control module may include an operation control unit and may be configured to control shutdown of an operation unit of the operation module according to a determination condition.

Alternatively, the determination condition may be a threshold determination condition and/or a function mapping determination condition.

Alternatively, a threshold determination condition may include: being less than a given threshold, being greater than a given threshold, being within a given value range, or being outside a given value range. Alternatively, a function mapping determination condition may refer to whether a given condition is satisfied after a function transformation is performed.

As an alternative example, the operation module may include a plurality of operation units, where each of the operation units may include a temporary caching unit and one or more operation components, where the operation components may include one or more of adder, multiplier, and selector.

As an alternative example, the operation module may include n multipliers located at a first stage and an adder tree of n input located at a second stage, where n represents a positive integer.

As an alternative example, the n multipliers located at the first stage may be connected to the operation control unit respectively. The operation control unit may be capable of controlling shutdown of the multipliers according to a given determination condition. Alternatively, the determination condition may be configured as: the operation control unit determines whether the absolute values of input data into a multiplier are less than a given threshold, if a determination result is YES, the multiplier may be shut down.

As an alternative example, the adder tree may include k stages of adders, where a count of adders located at the first stage may be n/2, a count of adders located at a final stage, which is a $k^{th}$ stage, may be 1, where 2k=n; the n/2 adders located at the first stage of the adder tree may be connected to the n multipliers respectively to receive data signals and control signals sent by the multipliers; the adders located at the second stage to the $k^{th}$ stage of the adder tree may be connected to adders of a previous stage respectively to receive data signals and control signals sent by adders located at the previous stage.

As an alternative example, if a multiplier receives a shutdown signal from the operation control unit, a control signal 0 may be input into an adder located at the first stage of the adder tree, otherwise, a product may be transferred to an adder located at the first stage of the adder tree and a control signal 1 may be input to the adder located at the first stage; if an adder receives two control signals 1, input data may be accumulated together, and the accumulation result may be transferred to an adder located at a next stage and a control signal 1 may be sent to the next stage; if an adder receives a control signal 1 and a control signal 0, input data of a side that receives the control signal 1 may be sent directly to an adder located at a next stage and a control signal 1 may be sent to the adder located at the next stage; if an adder receives two control signals 0, the adder may be shut down and a control signal 0 may be sent to an adder located at a next stage. The rest can be done in the same manner until the adder tree obtains a final result by accumulating.

As an alternative example, the n multipliers located at the first stage and the adder tree of n input located at the second stage may be connected to the operation control unit respectively. The operation control unit may determine whether data to be operated satisfy a given determination condition, and shut down a corresponding multiplier or adder when the data to be operated satisfy the determination condition. For instance, it may be configured that if the absolute values of data input into a multiplier or an adder are less than a given threshold, the multiplier or the adder may be shut down. The operation control unit may determine whether the absolute values of the data input into the multiplier or the adder are less than the given threshold, the multiplier or the adder may be shut down when a determination result is YES.

As an alternative example, the operation device described above may further include: a data processing module configured to expand or compress data; correspondingly, the control module may include a data control unit configured to control whether or not the data processing module expands or compresses data.

As an alternative example, if data to be operated by the data processing module are synaptic values that are in a sparse mode (in other words, a sparse network represented by sparse encoding), the data processing module may compress neuron data according to sparseness of the synaptic values, compress and screen out neuron data that need not be operated.

As an alternative example, when data to be operated by the data processing module are neuron data that are in a sparse mode, the data processing module may compress synapses according to sparseness of neuron data, compress and screen out synaptic data that need not be operated.

As an alternative example, the data processing module may also compress synapses and/or neuron data according to a given compression determination condition. Specifically, the data control unit of the control module may determine whether or not synapses and/or neuron data that need to be operated meet a given compression determination condition, and when a determination result is YES, compress the synapses and/or the neuron data.

Alternatively, the compression determination condition described above may include a threshold determination condition or a function mapping determination condition.

As an alternative example, the n multipliers located at the first stage of the operation module may be connected to the data processing module respectively for receiving neuron data and synaptic data output by the data processing module.

Figure 3:
FIG. 3 is a structural diagram of an operation device in another example of the disclosure.

FIG. 3 is a structural diagram of an operation device provided in an example of the disclosure. The operation device may include an operation module and a control module. The operation module may include m operation units, where each of the operation units may include one multiplier, one adder, and one temporary caching unit; the control module may include m operation control units, where each of the operation control units may be connected to a multiplier and an adder of an operation unit respectively. Each of the operation control units may control shutdown of corresponding multiplier and adder according to a given determination condition, where m represents a positive integer.

As an alternative example, a multiplier of an operation unit may have three input terminals and one output terminal. Among three input terminals of a multiplier, two of them may be configured to receive neuron data and synaptic data, and the remaining one may be configured to input control signals. An output terminal of the multiplier may be configured to output results of multiplication.

As an alternative example, an adder of an operation unit may have three input terminals and one output terminal. Among three input terminals of an adder, two of them may be configured to receive results of multiplication and data input by a temporary caching unit, and the remaining one may be configured to input control signals. An output terminal of the adder may be configured to output results of addition, where the results may be stored back into the temporary caching unit to be used as input data into a next stage for addition.

As an alternative example, synaptic data may be broadcast to operation units. If an operation control unit determines that neuron data input into an operation unit satisfy a given determination condition (e.g., being less than a given threshold), a control signal may be sent to the operation unit to control the operation unit to shut down a multiplier and an adder of the operation unit. It should be noted that, in this case, partial sums stored in the temporary caching unit may remain unchanged. If the operation control unit determines that neuron data input into the operation unit does not satisfy a determination condition, the operation unit may firstly employ the multiplier to multiply two input data, then accumulate the product and data stored in the temporary caching unit together, and finally store the accumulation result back into the temporary caching unit.

Figure 4:
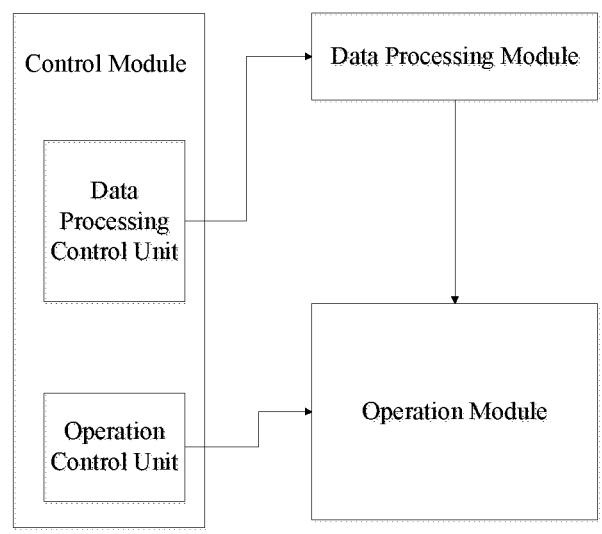
FIG. 4 is a structural diagram of an operation device in another example of the disclosure.

FIG. 4 is a structural diagram of an operation device provided in an example of the disclosure. The operation device may include an operation module, a data processing module, and a storage module. One input terminal of a multiplier of the operation module may be connected to the data processing module for receiving compressed synaptic data; and another input terminal of the multiplier may be connected to the storage module for receiving neuron data.

As an alternative example, the operation module may include p operation units, where each of the operation units may include one multiplier, one adder, and one selector. Correspondingly, the control module of the operation device may include p operation control units, where each of the operation control units may be connected to a multiplier and an adder of an operation unit respectively. An operation control unit may control shutdown of a multiplier and an adder of a corresponding operation unit according to a determination condition, where p represents a positive integer.

As an alternative example, a multiplier of each of the operation units of the operation module may have three input terminals and one output terminal. Among three input terminals of a multiplier, two of them may be configured to receive neuron data and synaptic data, and the remaining one may be configured to input control signals. An output terminal of the multiplier may be configured to output results of multiplication.

As an alternative example, for the operation units of the operation module, an adder in a first operation unit may have three input terminals and one output terminal. Among three input terminals of the adder of the first operation unit, two of them may be configured to receive results of multiplication and data input by the selector located at the current stage respectively, and the remaining one may be configured to input control signals. An output terminal of the adder of the first operation unit may be configured to output results of addition, where the results may be sent to a next operation unit through the selector for serving as input data for addition operation of the next stage.

For the operation units of the operation module, each of adders of a second operation unit to a $p^{th}$ operation unit may have three input terminals and one output terminal. Among three inputs of each of the adders of the second operation unit to the $p^{th}$ operation unit, two of them may be configured to receive addition results of adders located at a previous stage and data input by selectors located at the previous stage respectively, and the remaining one may be configured to input control signals. An output terminal of each of the adders located at the second operation unit to the $p^{th}$ operation unit may be configured to output addition results.

Figure 5:
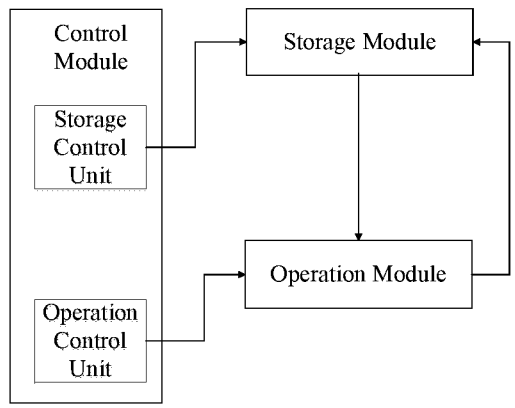
FIG. 5 is a structural diagram of an operation device in an example of the disclosure.

FIG. 5 is a structural diagram of an operation device provided in an example. The operation device may include a control module, a storage module, and an operation module, where the storage module may be connected to the control module, and may be configured to control the storage module to store or read required data; the storage module may also be connected to the operation module, and may be configured to input data to be operated into the operation module, as well as receive and store data operated by the operation module. Alternatively, the control module may also be connected to the operation module, and may be configured to control a manner in which the operation module may work according to a type and data of an operation to be performed.

As an alternative example, the control module may include a storage control unit. The storage control unit may be configured to control the storage module to store or read required data.

As an alternative example, the control module may include an operation control unit. The operation control unit may controls whether and how respective components of the operation device work according to a type and data of an operation to be performed. Alternatively, the operation module may be divided into a plurality of operation groups. The control module may control each of the operation groups of the operation module respectively. Alternatively, the control module may also treat the operation module as a whole and control the operation module integrally or individually from the external.

As an alternative example, the storage module of the operation device may include a data storage unit and a temporary caching unit. Alternatively, one or more data storage units may be configured according to demand. In other words, data to be operated may be stored in the same area or may be stored separately; alternatively, intermediate results to be stored may be stored in the same area or may be stored separately.

As an alternative example, the operation module of the operation device may have a plurality of structures. For instance, the operation module may include one or more operation units, where each of the operation units may include one or more multipliers and one or more adders. Data to be operated or intermediate results may be transferred between the operation units in a certain direction.

As an alternative example, the operation device may further include a data processing module, and may be configured to expand and compress data. Correspondingly, the control module may include a data control module, and may be configured to determine whether or not the data processing module expands data.

An operation process of the operation device shown in FIG. 5 is generally as follows: the storage control unit of the control module may send a control signal of reading to the storage module, so as to control the storage module to choose and read data to be operated; if data read by the storage module include both compressed mode data and expanded mode data, a data control unit may control the data processing module to expand compressed data in the data, and the data control unit may also control the data processing module to compress data to be operated corresponding to the compressed mode data to be operated. Then, the operation control unit may prepare to send an operation signal to be operated, and determine the values of data to be operated which are read, if the values of the data to be operated satisfy a given determination condition (e.g., satisfying a condition that the absolute values of the data to be operated are less than a given threshold), a signal of shutdown may be sent to a corresponding operation component of the operation module, otherwise, an operation signal to be operated may be sent to a corresponding operation component of the operation module. After the operation is finished, if data obtained need to be compressed or expanded, the data control unit may receive the data, determine whether or not the data satisfy a given compression or expansion condition, and may then control the data processing module to compress or expand the data according to a determination result, which in other words, refers to that data that need not be operated may be compressed and screened out, or data in sparse representation may be expanded into non-sparse representation. Finally, the storage control unit may control whether or not to store the result into the storage module, for instance: if the storage control unit determines that data obtained need no further processing, the result may be stored directly into the storage module.

Figure 6:
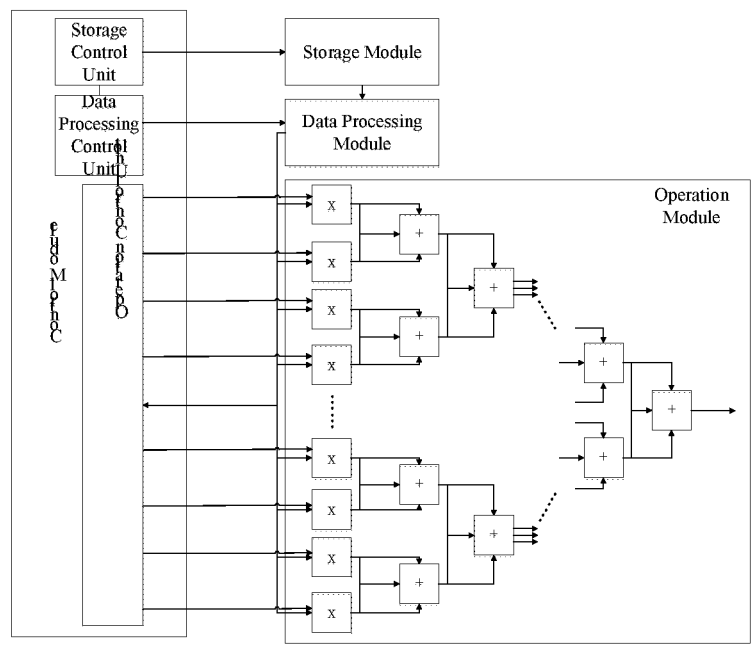
FIG. 6 is a structural diagram of an operation device in an example of the disclosure.

FIG. 6 shows an operation device provided in another example of the disclosure. The operation device may include an operation module, a storage module, a data processing module, and a control module. The operation module, the storage module, and the data processing module may be connected to the control module respectively, the storage module may be connected to the data processing module, and the data processing module may be connected to the operation module. The operation module may include an operation control unit that may be connected to the operation module, a data control unit that may be connected to the data processing module, and a storage control unit that may be connected to the storage module. The operation module may include n multipliers (n represents a positive integer) and an adder tree of n input. The operation control unit may perform overall control on the operation module, and may send control signals to each multiplier. Each adder and each multiplier may receive data signals as well as control signals, which in other words, refers to that in addition to receiving data to be operated, each adder and each multiplier may also receive control signals and send control signals to a next stage.

When employing the operation device shown in FIG. 6 to perform data operation, an operation process is as follows: firstly, the storage control unit may control the storage module to read neuron data and synaptic data. If the synaptic data are stored in a manner of sparse encoding, the neuron data and the index values of the synaptic data may be transferred to the data processing module, and the neuron data may be compressed according to the index values, which in other words, refers to that only neuron data that are to be operated with the synaptic data that are sent into the operation units may be selected. Then, the data processing module may transfer processed neuron data together with the synaptic data into the respective operation units. Each multiplier may receive a neuron data and corresponding synaptic data. Then an operation result of each multiplier may be sent to an adder located at a next stage for accumulation, and the result of the accumulation may be sent to an adder located at a stage after next for accumulation until a final result is obtained.

For operations performed by multipliers located at a first stage, data to be operated may be input into the multipliers located at the first stage and the operation control unit at the same time. The operation control unit may perform a threshold determination on the data to be operated. When the operation control unit determines that the absolute values of neuron data input into a multiplier are less than a given threshold, the operation control unit may shut down the multiplier, in this case, the multiplier may receive a shutdown signal, input a control signal 0 to an adder, and then be shut down; otherwise, products may be transferred to an adder, and a control signal 1 may be input. When an adder receives two control signals 1, the adder may accumulate input data, send the result of the accumulation as well as a control signal 1 to a next stage. When an adder receives a control signal 1 and a control signal 0, input data from a side that sends the control signal 1 may be transferred directly to a next stage and a control signal 1 may be input to the next stage. When an adder receives two control signals 0, the adder may be shut down and send a control signal 0 to an adder located at a next stage. The rest can be done in the same manner until the adder tree obtains a final result by accumulation. The storage control unit may control the final result to be written in the storage module. By turning on or shutting down a multiplier or adder whose input is less than a threshold, the power consumption during an operation may be further reduced without affecting the speed of parallel operation It should be noted that in addition to that the absolute values of values to be determined are less than a given threshold, a determination condition of shutting down a multiplier may also be one of the following conditions: values to be determined are greater than a given threshold; values to be determined are within a given value range, which means that the values are between a small threshold and a large threshold; values to be determined are outside a given value range, which means that the values are greater than a threshold or less than a threshold; or after function mapping, values to be determined satisfy a certain condition, such as: being equal to a given threshold; being greater/less than a given threshold; being within a given value range. A specific determination condition may be configured or adjusted according to specific cases, which is not confined herein.

Figure 7:
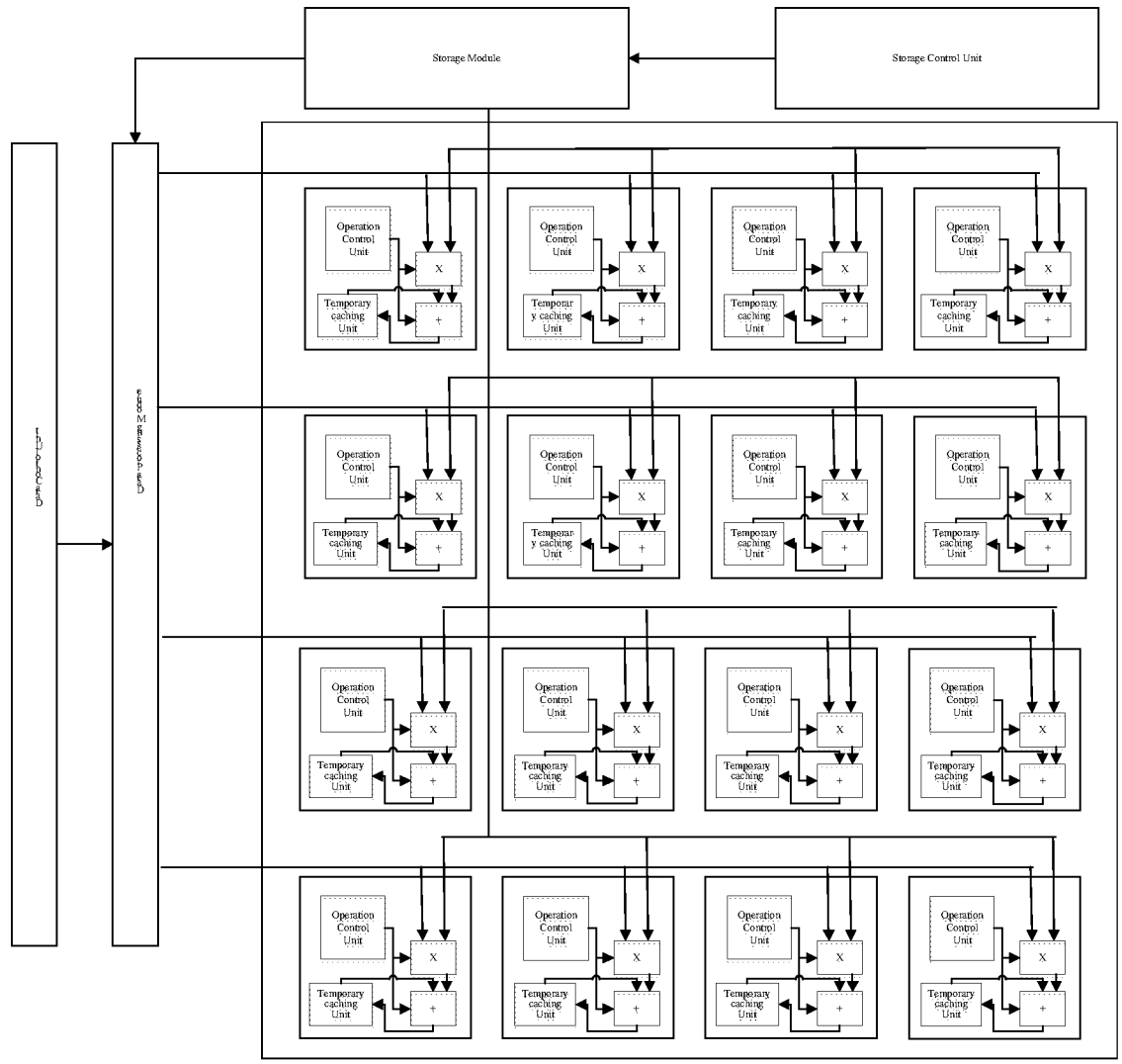
FIG. 7 is a structural diagram of an operation device in an example of the disclosure.

FIG. 7 is a structural diagram of an operation device provided in an example of the disclosure. An operation module of the operation device may include n operation units (n is a positive integer), where each operation unit may include one multiplier, one adder, and one temporary caching unit. Each of operation unit may further include one operation control unit. Synaptic data may be broadcasted to every operation unit, and neurons may be transferred to every operation unit directly by a storage module.

When employing the operation device shown in FIG. 7 to process data, an operation process is as follows: firstly, initializing a temporary caching unit of each operation unit to 0; controlling a storage module, by a storage control unit, to read neuron data, if synaptic data are stored in a manner of sparse encoding, transferring the index values of synapses together with the neuron data to a data processing module, and compressing the neuron data according to the index values, which in other words, means selecting neuron data that are to be operated with the received synaptic data in an operation unit; then, transferring the compressed neuron data to each operation unit; meanwhile, controlling the storage module, by the storage control unit, to read the synaptic data, and broadcasting, by the storage module, a first synaptic data to all operation units; when an operation unit receives neuron data, determining, by an operation control unit, whether the neuron data are less than a given threshold, if the neuron data are less than the given threshold, shutting down a multiplier and an adder of the operation unit, keeping a partial sum stored in the temporary caching unit unchanged, otherwise, employing, by the operation unit, the multiplier to multiple two input data, accumulating the result of the multiplication and data stored in the temporary caching unit together, and storing the result of the accumulation back into the temporary caching unit; after that, broadcasting a second synaptic data and repeating the operation above until all synaptic data are broadcasted. Storing, by the storage control unit, n operation results into the storage module; performing a next turn of operation until all operations are finished; when the synaptic data are dense, after the neuron data are read from the storage module, the data processing module may be skipped, and the data may be transferred to the operation module directly.

It should be noted that in addition to that the absolute values of values to be determined are less than a given threshold, a determination condition of shutting down a multiplier and an adder may also be one of the following conditions: values to be determined are greater than a given threshold; values to be determined are within a given value range, which in other words, refers to that the value are between a small threshold and a large threshold; values to be determined are outside a given value range, which in other words, refers to that the value are greater than a threshold or less than a threshold; or after function mapping, values to be determined satisfy a certain condition, such as: being equal to a given threshold; being greater/less than a given threshold; being within a given value range.

The operation device provided in the present example may fully utilize a feature of a neural network, for instance, the reuse of synapses, repeated reading of data may thus be reduced. According to the values of neuron data, a corresponding multiplier and adder may be shut down and not perform any operation when the absolute values of the neuron data are less than a given threshold. The power consumption may thus be reduced.

Figure 8:
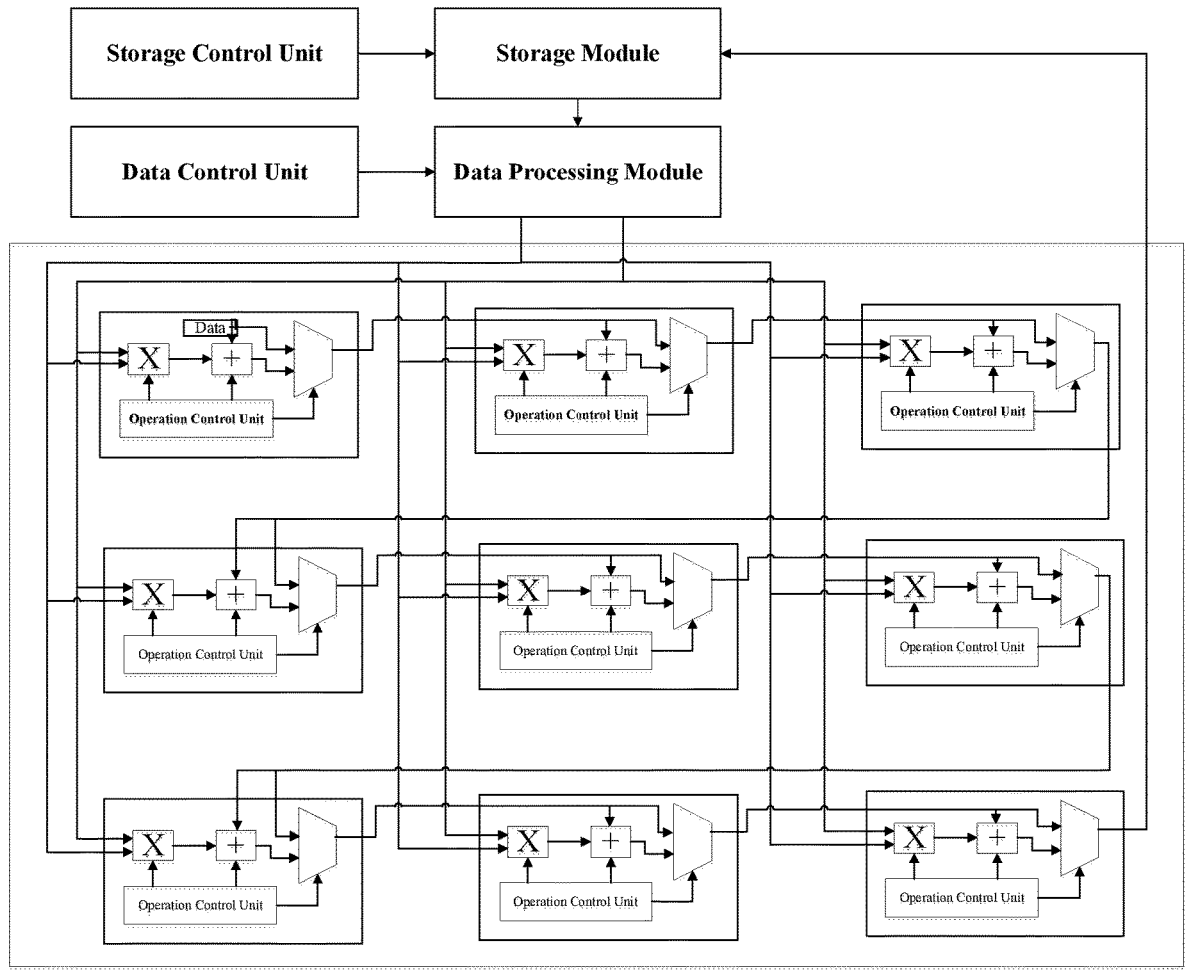
FIG. 8 is a structural diagram of an operation device in an example of the disclosure.

FIG. 8 is a structural diagram of an operation device provided in the disclosure. An operation module of the operation device may include n operation units. Each operation unit may include one multiplier, one adder, one selector, and one operation control unit, where each operation control unit may a corresponding operation unit respectively.

When employing the operation device shown in FIG. 8 to process data, an operation process is as follows: firstly, controlling a storage module, by a storage control unit, to read synaptic values, and sending the synaptic values to a data processing module; controlling a data processing module, by a data control module, to compress synapses according to whether the synaptic values are less than a given compression threshold, which in other words, means only selecting synaptic values of which the absolute values are not less than the given compression threshold, and then transferring to each operation unit respectively while ensuring the synaptic values remain unchanged; then, controlling the storage module again, by the storage control unit, to read neuron values; controlling the data processing module, by the data control module, to compress neuron data according to whether the neuron values are less than the given compression threshold, which in other words, means only selecting neuron values of which the absolute values are not less than the given compression threshold, and transferring to an operation control unit of each operation unit; receiving the neuron data by an operation control unit, taking the absolute values of the neuron data, and determining whether the absolute values are less than a given operation threshold; if the absolute values are less than the operation threshold, shutting down a multiplier and an adder, and transferring, by a selector, data from a previous stage directly to a selector of a next stage; otherwise, multiplying the neuron data and synaptic data by the multiplier, and then sending the product to the adder; receiving the product by the adder, and then accumulating the product and the data from the previous stage together; inputting the result of the accumulation to the selector; selecting, by the selector, the result output by the adder as an output result of the current stage and transferring the result to an adder and a selector located at the next stage; the rest can be done in the same manner until the operation is finished and a final result is obtained; storing the final result by the storage control unit in the storage module.

By selecting synapses and neurons for a plurality of times, a method of processing data by the operation device provided by the present example may be able to maximally increase a percentage of valid data in an algorithm, further reduce the quantity of operations to accelerate the operation speed, as well as fully utilize a feature of a neural network, which is synapses sharing, to avoid the power consumption of memory access caused by repeating read of synapses. Moreover, the method of processing data by the operation device may shut down idle multipliers and adders when data to be operated are less than a given operation threshold, which may further reduce the power consumption.

It should be noted that in addition to that the absolute values of values to be determined are less than a given threshold, a determination condition of shutting down a multiplier and an adder may also be one of the following conditions: values to be determined are greater than a given threshold; values to be determined are within a given value range, which in other words, refers to that the values are between a small threshold and a large threshold; values to be determined are outside a given value range, which in other words, refers to that the values are greater than a threshold or less than a threshold; or after function mapping, values to be determined satisfy a certain condition, such as: being equal to a given threshold; being greater/less than a given threshold; being within a given value range.

Moreover, although in the example above, compression may be performed according to determination of whether data to be operated are less than a given threshold, yet a compression determination condition of the present disclosure is not limited to a threshold determination condition and may also be a function mapping determination condition.

In the example described above, a determination condition of shutting down an operation unit (being less than a given operation threshold or not) and a data compression determination condition (being less than a given compression threshold or not) may be configured as the same determination condition (for instance, both are configured as threshold determination conditions, where thresholds may be the same or different), or may be configured as different determination conditions (for instance, one is a threshold determination condition and the other is a mapping determination condition). This does not affect any implementation of the present disclosure.

An operation method is provided in an example of the present disclosure, and may include:

setting a determination condition; and controlling shutdown of an operation unit of an operation module according to the determination condition.

As an alternative example, the determination condition may include a threshold determination condition or a function mapping determination condition.

As an alternative example, the determination condition may be a threshold determination condition including: being less than a given threshold, being greater than a given threshold, being within a given value range, or being outside a given value range.

As an alternative example, the determination condition may be a function mapping determination condition, which refers to that whether a given condition is satisfied after a function transformation is performed.

As an alternative example, according to the determination condition, when the absolute values of input data into a multiplier are less than a given threshold, the multiplier may be shut down.

As an alternative example, a multiplier may receive a shutdown signal, and input a control signal 0 to adders located at a first stage of an adder tree, otherwise, the multiplier may transfer a product to the adders located at the first stage of the adder tree and input a control signal 1.

An adder located at the first stage may receive a control signal sent by a multiplier. Adders located at a second to a k' stages may receive control signals sent by adders located at previous stages respectively until the adder tree obtains a final result by accumulating.

When an adder receives two control signals 1, the adder may accumulate input data, send the result of the accumulation to an adder located at a next stage, and send a control signal 1 to the next stage. When an adder receives a control signal 1 and a control signal 0, input data from a side that sends the control signal 1 may be transferred directly to a next stage, and a control signal 1 may be input to the next stage. When an adder located at the first stage receives two control signals 0, the adder may be shut down, and a control signal 0 may be sent to an adder located at a next stage.

As an alternative example, the determination condition may be a threshold determination condition. An operation control unit may set a threshold, compare the absolute values of data input into a multiplier/adder with the threshold. If the absolute values of the data input into a multiplier/adder are less than the threshold, the multiplier/adder may be shut down.

As an alternative example, if a multiplier of an operation unit is not shut down, input neuron data and synaptic data may be multiplied, and the result of the multiplication is output; otherwise, an adder of the operation unit may be shut down at the meantime, and a partial sum stored in a temporary caching unit may remain unchanged.

If the adder of the operation unit is not shut down, the adder may receive a multiplication result, add the result with data input by the temporary caching unit together, and output the result of the addition. The result of the addition may be stored back into the temporary caching unit to be used as input data for an addition operation of a next stage until the operation is finished; otherwise, a partial sum stored in the temporary caching unit may remain unchanged.

As an alternative example, when a multiplier of an operation unit is not shut down, input neuron data and synaptic data may be multiplied, the result of the multiplication may be output; otherwise, an adder of the operation unit may be shut down at the meantime, a selector may select to transfer data from a previous stage directly to a selector of a next stage.

If the adder of the operation unit is not shut down, the result of multiplication is received and added to the input data of the current stage or the data input by a selector of the previous stage, the result of the addition is output and sent into a next operation unit through the selector.

Otherwise, when the adder and the multiplier are shut down, the selector may select input data into the current stage or data input by the selector located at the previous stage as a result output by the current operation unit.

As an alternative example, the operation method described above may further include: expanding or compressing data to be operated.

As an alternative example, the data processing module may expand and compress data. If synaptic values are in a sparse mode, neuron data may be compressed according to sparseness of the synaptic values, neuron data that need not be operated may be compressed and screened out; or, if neuron data are in a sparse mode, synapses may be compressed according to sparseness of the neuron data, synaptic data that need not be operated may be compressed and screened out; or, a compression determination condition may be set, and the synapses and/or the neuron data may be compressed according to the compression determination condition.

Figure 9:
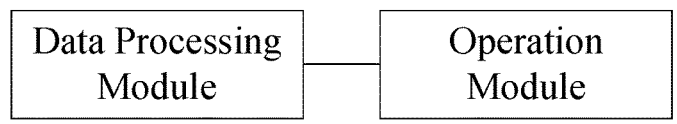
FIG. 9 is a structural diagram of a training device in an example of the disclosure.

FIG. 9 is a structural diagram of a training device provided in an example of the present disclosure. The training device may include: a data processing module that may be configured to compress or expand input data; and, an operation module that may be connected to the data processing module and configured to receive data processed by the data processing module to perform operations.

As an alternative example, the data processing module may include: a data compression unit that may be configured to compress input data according to a compression determination condition; and a data expansion unit that may be configured to expand input data according an expansion determination condition.

As an alternative example, the data expansion unit may be configured to expand input data by expanding compressed sparse data into an uncompressed format.

As an alternative example, the compression determination condition may include a threshold determination condition or a function mapping determination condition. The expansion determination condition may also include a threshold determination condition or a function mapping determination condition. Alternatively, the threshold determination condition may include: being less than a given threshold, being greater than a given threshold, being within a given value range, or being outside a given value range.

As an alternative example, the data compression unit may screen and compress input data according to the sparse indices of data to obtain data to be operated; or may determine according to the values of data, and then may screen and compress to obtain values that satisfy the compression determination condition.

As an alternative example, the data compression unit may screen and compress input neuron data according to the sparse indices of synaptic data to obtain neuron data to be operated; or may screen and compress input synaptic data according to the sparse indices of neuron data to obtain synaptic data to be operated.

As an alternative example, the data compression unit may compare synaptic values with a given compression threshold, screen and compress to obtain synaptic data whose absolute values are not less than the given compression threshold; or may compare neuron values with the given compression threshold, screen and compress to obtain neuron data whose absolute values are not less than the given compression threshold.

As an alternative example, the data processing module may further be configured to determine whether to send gradients and data to be operated to the operation module according to a gradient determination condition. Alternatively, the gradient determination condition may include a threshold determination condition or a function mapping determination condition. Alternatively, the gradient determination condition may include: being less than a given threshold, being greater than a given threshold, being within a given value range, or being outside a given value range.

As an alternative example, when the data processing module determines the absolute value of a neuron gradient is less than a given compression threshold, the gradient and a corresponding synapse to be operated may be compressed, which in other words, means that the gradient and the corresponding synapse to be operated may not be sent to the operation module for operating; otherwise, when the absolute value of a gradient is not less than the given compression threshold, the gradient and a corresponding synapse to be operated may be sent to the operation module for operating.

As an alternative example, when synapses are stored in a sparse form, before being transferred to the operation module, the synapses and the indices values of the synapses may be expanded by the data processing module and may be expanded into a non-sparse form.

As an alternative example, the operation module of the training device may include: a first operation unit including a plurality of PEs, where each PE may include a multiplier and/or an adder for performing multiplication operation, addition operation, or multiplication-addition operation; a second operation unit including two sets of adder trees, where each set of the adder trees may include a plurality of adder trees for performing accumulation operation; and a third operation unit including ALU.

As an alternative example, the first operation unit may include M*N PEs, where each PE may include one multiplier and one adder; the second operation unit may include two sets of adder trees, where one set may include M adder trees of N input, and the other set may include N adder trees of M input; the third operation unit may include max(M,N) ALUs; and M and N represent positive integers.

As an alternative example, the first operation unit may be configured to perform multiplication on gradients and synapses, which in other words, refers to performing one-to-one multiplication on the synapses and the corresponding gradients, and the second operation unit may employ an adder tree to accumulate data to be accumulated which belong to the same column; if the accumulation result is not a final accumulation result needed, then the accumulation operation is not finished, the third operation unit may be skipped and the intermediate result may be stored into a caching unit to be accumulated at a next turn; otherwise, the following operation may be performed by ALU in the third operation unit.

As an alternative example, if an activation function exists at a previous stage of the third operation unit, the third operation unit may further be configured to multiply the accumulation result by an inverse function of the activation function to obtain a final gradient.

As an alternative example, the third operation unit may further be configured to perform zero-setting on the gradient according to a zero-setting determination condition.

As an alternative example, the zero-setting determination condition may be a threshold determination condition, if the absolute value of a gradient is less than the zero-setting threshold, the gradient may be set to zero; otherwise, the gradient may remain unchanged.

As an alternative example, the training device above may further include: a storage module that may be configured to store data; a control module that may be configured to store and send instructions to control the storage module, the data control module, and the operation module.

Figure 10:
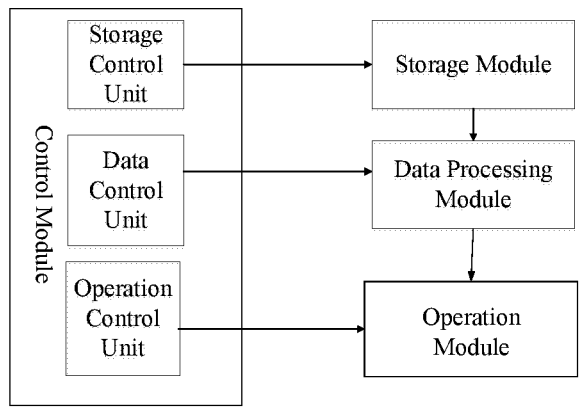
FIG. 10 is a structural diagram of an operation module in a training device in an example of the disclosure.

FIG. 10 is a structural diagram of a training device provided in an example of the present disclosure. The training device may be used for sparse training of a neural network and may be capable of supporting a whole training process of the neural network. The training device may include a control module, a storage module, a data processing module, and an operation module.

The control module may be capable of controlling the storage module, the data control module, and the operation module to achieve an orderly cooperation within the sparse training device. Alternatively, the control module may control the operation of the storage module, the data control module, and the operation module by sending control instructions stored in the control module. The storage module may be mainly configured to store data, where the data may include neuron data, synaptic data, intermediate result data, final result data which are to be operated during an operation process, other related parameters required in the operation, and the like. The data processing module may be mainly configured to screen data to be operated, and select data that need to be input into the operation module for operating according to a determination condition. The operation module may be mainly configured to perform neural network operations and send intermediate result data and final result data that need to be stored back into the storage module for storing.

Figure 11:
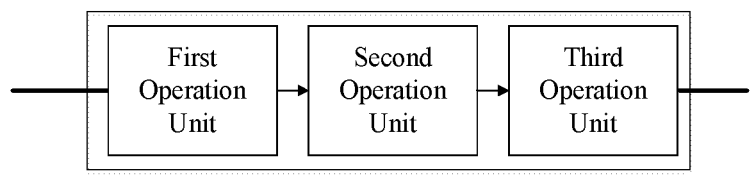
FIG. 11 is a structural diagram of an operation module in a training device in an example of the disclosure.
Figure 12:
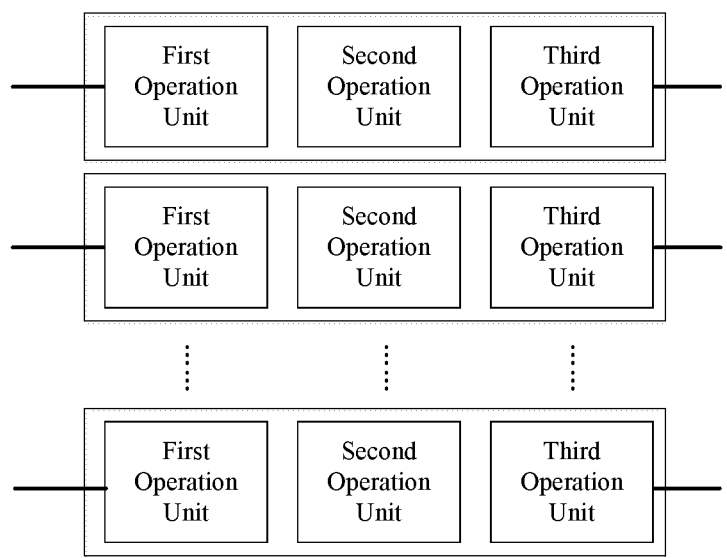
FIG. 12 is a structural diagram of an operation module in a training device in an example of the disclosure.

As an alternative example, as shown in FIGS. 11 and 12, the operation device of the training device described above may include a plurality groups of operation units, where each group of operation units may include a first operation unit, a second operation unit, and a third operation unit. The first operation unit may include a plurality of PEs, where each PE may include a multiplier and/or an adder for performing multiplication, addition, or multiplication-addition operation. The second operation unit may include a plurality of adder trees for performing accumulation. The third operation unit may include ALU, which may optionally be lightweight ALU that refers to the ALU with functions needed. The operation module may be configured to perform a series of non-linear operations including exponentiation, activation, comparison, and basic operations including individual multiplication and addition. Each operation unit of the operation module may be capable of performing a training process by cooperation, It should be noted that in an actual operation, a pipeline operation may be performed on the first operation unit, the second operation unit, and the third operation unit according to actual demands, an operation unit or an operation part of an operation unit may also be skipped, for instance, an accumulation operation in the second operation unit may not be needed in a POOLING layer and may thus be skipped directly.

Figure 13:
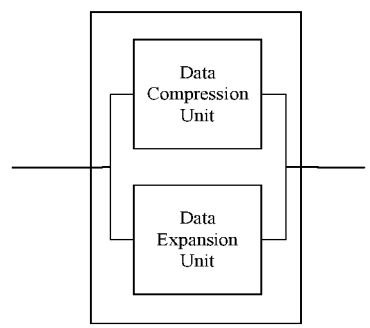
FIG. 13 is a structural diagram of an operation module in an example of the disclosure.

FIG. 13 is a structural diagram of a data processing module of a training device provided in an example of the present disclosure. The data processing module may include a data compression unit and a data expansion unit. The data compression unit may compress input data according a compression determination condition; the data expansion unit may be configured to expand input data according to an expansion determination condition. The compression determination condition and the expansion determination condition may include a threshold determination condition or a function mapping determination condition. The threshold determination condition may be one of the following: being less than a given threshold, being greater than a given threshold, being within a given value range, or being outside a given value range.

As an alternative example, the data compression unit may be capable of compressing data, alternatively, the data compression unit may be capable of compressing neuron data as well as synaptic data. Specifically, when synaptic data are in sparse representation, the data compression unit may be capable of screening and compressing input neuron data according to the sparse indices of the synaptic data, and the "valid" neuron data to be operated may be selected and sent to a next operation module together with synaptic values for operating. Otherwise, when neuron data are in sparse representation, the data compression unit may screen and compress input synaptic data according to the sparse indices of the neuron data.

Figure 14:
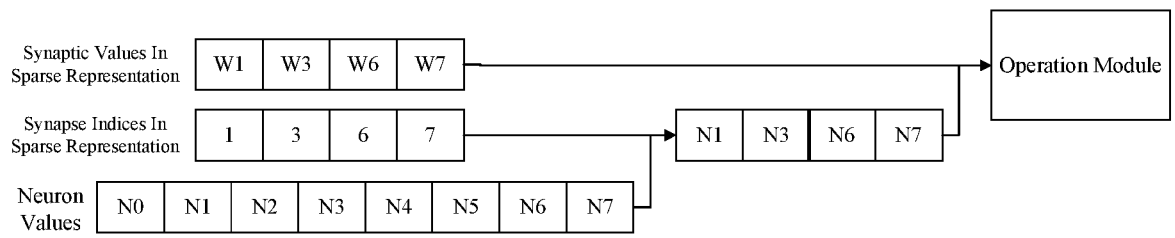
FIG. 14 is a schematic diagram of data compression by a data compression unit in an example of the disclosure.

For instance, as shown in FIG. 14, synapses are data in sparse representation, neurons are data in dense representation, and the data compression unit may compress neuron values according to the indices of the synapses in sparse representation. Sparse representation employed herein may include two arrays, where a first array may be configured to record synaptic values that are in sparse representation, and the other array may be configured to store corresponding locations of the synaptic values, which in other words, refers to indices. A length of an initial number sequence is assumed to be 8. Then according to index values, synaptic values in sparse representation are located at $1^{st}, 3^{rd}, 6^{th}, 7^{th}$ locations respectively (a starting location is 0), according to the group of index values, values to be operated are selected from neuron values, where the values to be operated are neurons that located at the $1^{st}, 3^{rd}, 6^{th}, 7^{th}$ locations, then, the neuron data to be operated are selected to obtain a compressed neuron sequence, which is N1N3N6N7 and is then operated with the synaptic values in sparse representation in the same operation unit.

In addition, the data compression unit may also make determine according to the values of data so as to screen and compress the data to obtain values that satisfy a compression determination condition, and transfer to a next operation module for operating. Taking a threshold determination condition as an instance, the data compression unit may compare the values of synapses with a given threshold, then screen and compress synaptic data of which the absolute values are not less than the given threshold. The data compression unit may also compare the values of neurons with the given threshold, then screen and compress to obtain neuron data of which the absolute values are not less than the given threshold.

Figure 15:
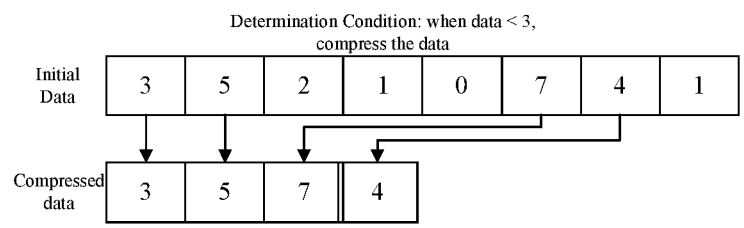
FIG. 15 is a schematic diagram of data compression by a data compression unit in an example of the disclosure.

Certainly, the data compression unit may also perform compression according to values of data. FIG. 15 shows a data compression unit, which is provided in the present disclosure, performing compression according to the values of data. A length of an initial sequence is assumed to be 8, where the sequence is 35210741 respectively. A compression condition is given, for instance, the compression condition may be compressing values less than 3, then 012 are compressed and screened out, and other values are retained to form a compressed sequence, which is 3574.

As an alternative example, the data expansion unit of the data processing module may be configured to expand input data. The data expansion unit may expand neuron data as well as synaptic data. Expanding data refers to expanding originally compressed sparse data into an uncompressed format.

Figure 16:
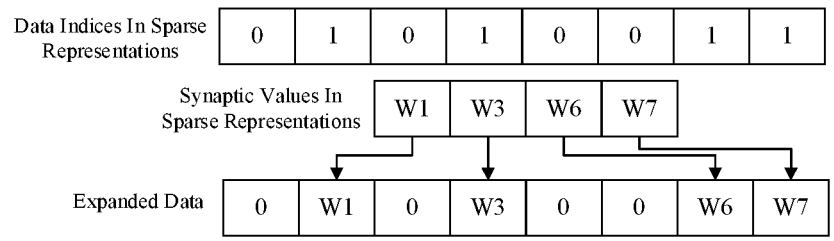
FIG. 16 is a schematic diagram of data expansion by a data expansion unit in an example of the disclosure.

For instance: FIG. 16 shows an example in which a data expansion unit provided in the present disclosure expands synaptic data in sparse representation. The sparse representation employed herein include two arrays, where one of the arrays may be configured to record synaptic values that are in sparse representation, and the other array may be configured to store corresponding locations of the synaptic values, which in other words, refers to indices. A length of an initial number sequence is assumed to be 8. Then according to indices, each location in a sequence corresponds to one number in the initial sequence. 1 represents that an initial sequence value is valid, which in other words, means that the initial sequence value is not 0. 0 represents that an initial sequence value is 0, which indicates that the synaptic values in sparse representation are located at the $1^{st}, 3^{rd}, 6^{th}, 7^{th}$ locations respectively (the starting location is 0). According to the group of indices, synaptic values are placed at locations corresponding to the indices, other locations are 0, and then an expanded non-compressed sequence is obtained.

It should be noted that, when the data processing module processes data, if data need not be compressed or expanded, the data processing module may be skipped, and the storage module may transfer the data to the operation module directly for operating.

Figure 17:
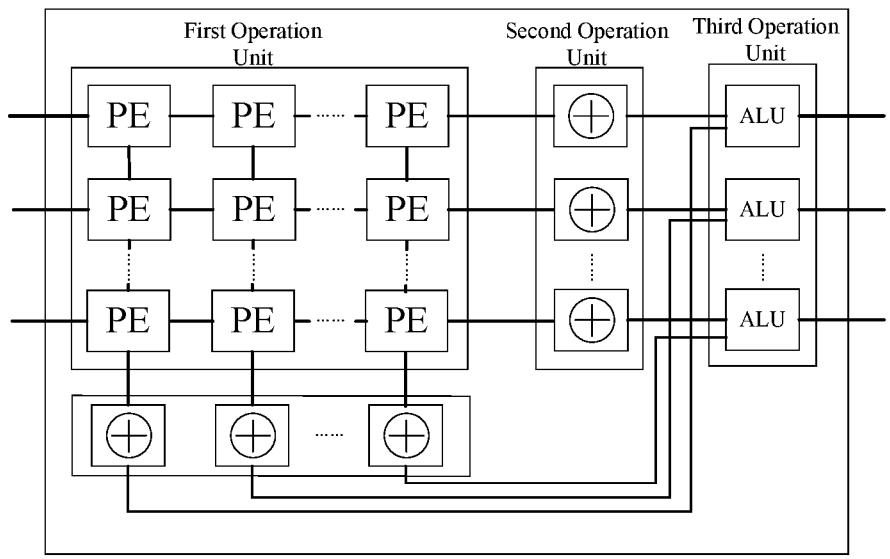
FIG. 17 is a structural diagram of an operation module of a training device in an example of the disclosure.

An example of the present disclosure provides a training device. FIG. 17 shows a structure of an operation module of the training device, where a first operation unit of the operation module may include M*N PEs, where each PE may include one multiplier and one adder. A second operation unit of the operation module may include one or more sets of adder trees, where each set of adder trees may include M adder trees of N input. Alternatively, the second operation unit of the operation module may include two sets of adder trees. In this case, one set of adder trees may include Madder trees of N input, and the other set of adder trees may include N adder trees of M input. Alternatively, the second operation unit may also include one set of adder trees, where the set of adder trees may include max(M,N) adder trees. The same operation can be performed simply by adding a corresponding data transfer wire. A third operation unit of the operation module may include max(M,N) (in other words, the larger one from M and N may be taken) lightweight ALUs (in other words, ALU may only include required operation components of an operation).

An example of the present disclosure takes a convolutional layer of a sparse convolution neural network as an instance to illustrate a process of back training performed by the training device provided in the example above. The device may be capable of accelerating back training. It can be assumed that during back training, gradient represents an input gradient from a lower layer, w represents a synapse of forward inference, index represents a corresponding sparse index, and input represents an input neuron value of forward inference. It should be noted that, during back training, the data processing module may determine whether or not to send a gradient and data to be operated to the operation module according to a gradient determination condition. A detailed process is as follows:

Firstly, updating a neuron gradient gradient' of an upper layer. Sending a fetch instruction by the control module, reading a gradient gradient and a corresponding synapse w and sending them to the data compression unit of the data processing module for screening and compressing. If the absolute value of gradient is less than a given compression threshold, skipping gradient and a corresponding synapse to be operated, which in other words, means not sending gradient and the corresponding synapse to the operation module for operations; if the absolute value of gradient is not less than the given compression threshold, sending gradient together with the corresponding synapse w to the operation module for operations. In addition, if the synapse w is stored in sparse representation, to facilitate accumulation of gradients of neurons, before sending w into an operation part, sending w together with index to the data expansion unit of the data processing module for expansion into a non-sparse mode, and then sending w together with gradient to the operation module for operations. In the operation module, firstly, sending the gradient and the synapse to the first operation unit for multiplication of the gradient and the synapse, where one-to-one multiplication may be performed on w and a corresponding gradient, then sending results of the multiplication to an adder tree in the second operation unit corresponding to the column, and accumulating, by the adder tree, data to be accumulated which belong to the same column. Determining whether the accumulation result is a final accumulation result needed according to whether a preset count of operations/number of cycles/beats is reached. If the accumulation result is not the final accumulation result needed, the accumulation operation is not finished, skipping the third operation unit, and storing the intermediate result for accumulation in a next turn; otherwise, sending the accumulation result to corresponding ALU in the third operation unit for subsequent operations. If an activation function exists at the upper layer, multiplying the accumulation result and the inverse function of the activation function in the third operation unit to obtain a final gradient'. The ALU in the third operation unit may be configured to perform zero-setting on gradients according to a zero-setting determination condition. In an instance where a zero-setting threshold determination condition is set as the zero-setting determination condition, if a user provides a zero-setting threshold, determining in the third operation unit that if the absolute value of gradient' is less than the zero-setting threshold, gradient'=0, otherwise, gradient' remains unchanged. Storing the result back into the storage module. Certainly, the zero-setting threshold may also be another determination condition, such as a function mapping. If gradient' satisfies a given determination condition, setting gradient' to zero and storing gradient', otherwise, storing the initial value.

Then, updating the synapse. Sending a fetch instruction by the control module, and reading neuron data input, index data index corresponding to the synapse w, and sending them to the data compression unit of the data processing module for compressing after reading the gradient gradient. In other words, compressing input according to index, then sending it to the operation module for operations. For each group of operation units, firstly, sending the gradient gradient and the initial neuron data input to the first operation unit for multiplication, where one-to-one multiplication may be performed on input and a corresponding gradient, then sending the results of the multiplication to the second operation unit, and accumulating, by an adder tree, data to be accumulated which belong to the same row. If the accumulation result is not a final accumulation result needed, the accumulation operation is not finished, skipping the third operation unit, and storing the intermediate result for accumulating in a next time; otherwise, sending the accumulation result to corresponding ALU in the third operation unit for subsequent operations. Receiving, by the third operation unit, the accumulated data, and dividing the accumulated data by a count of gradients connected to the synapse to obtain an update amount of the synapse. Multiplying the update amount by a learning rate, and storing the result in the storage module. Then, reading the synapse w and the update amount of the synapse from the storage module, and sending them to the first operation unit of the operation module for individual addition. Since other accumulation and non-linear operations may not be needed, the second and the third operation units may be skipped directly, and the updated synaptic data may be stored.

The training device may also be capable of supporting forward inference of a sparse neural network or a dense neural network, of which a process may be similar to the process of updating synapses, therefore, the training device provided in the present disclosure may be used for accelerating a training process of a whole neural network.

In another example of the present disclosure, a fully connected layer of a sparse convolution neural network is taken as an instance to illustrate the accelerating of back training by the training device provided in the present disclosure. It is assumed that during back training, gradient represents a gradient input from a lower layer, w represents a synapse of forward inference, index represents a corresponding sparse index, and input represents an input neuron value of forward inference. A detailed training process is as follows:

Firstly, updating a gradient gradient' of an upper layer. Sending a fetch instruction by the control module, reading a gradient gradient and a corresponding synapse w and sending them to the data compression unit of the data processing module for screening and compressing. Giving a determination threshold, if the absolute value of gradient is less than the given threshold, skipping gradient and a corresponding synapse to be operated, which in other words, means not sending gradient and the corresponding synapse to the operation module for operations; if the absolute value of gradient is not gradient together with the corresponding synapse w to the operation module for operations. Besides the determination threshold, the determination condition may also be another condition such as a determination range and a function mapping. If a given condition is satisfied, skipping Gradient and the corresponding synapse to be operated. If the synapse w is stored in sparse representation, before sending w into the operation module, sending w together with index to the data expansion unit of the data processing module for expansion into a non-sparse mode, and then sending w together with gradient to the operation module for operations. In the operation module, firstly, sending the data to the first operation unit for multiplication of the gradient and the synapse, where one-to-one multiplication may be performed on w and the corresponding gradient, then sending results of the multiplication to an adder tree in the second operation unit corresponding to the column, and accumulating, by the adder tree, N data to be accumulated which belong to the same column. If the accumulation result is not the final accumulation result needed, which in other words means that the accumulation operation is not finished, skipping the third operation unit, and storing the intermediate result for accumulation in a next turn; otherwise, sending the accumulation result to corresponding ALU in the third operation unit for subsequent operations. If an activation function exists at the upper layer, multiplying the accumulation result and the inverse function of the activation function in the third operation unit to obtain a final gradient'. If a user provides a zero-setting threshold, determining in the third operation unit that if the absolute value of gradient' is less than the zero-setting threshold, gradient otherwise, gradient' remains unchanged. Writing the result back to the storage module for storing. Besides the zero-setting threshold, the determination condition may be another condition such as a function mapping. If gradient' satisfies a given determination condition, setting gradient' to zero and storing gradient', otherwise, storing the initial value.

Then, updating the synapse. Sending a fetch instruction by the control module, reading neuron data input, index data index corresponding to the synapse w, and sending them to the data compression unit of the data processing module for compressing after reading the gradient gradient. In other words, compressing the input neuron input according to the synaptic index data index, then sending the input neuron input to the operation module for operating. For each group of operation units, firstly, sending data to the first operation unit for multiplication, where one-to-one multiplication may be performed on input and a corresponding gradient to obtain an update amount of the synapse. Multiplying the update amount of the synapse by a learning rate, and adding the result with the initial synapse received by PE from the storage module together to obtain a new synapse w. Then skipping the second and the third operation units, and storing the new synapse w.

It should be noted that, although in the above examples, a gradient determination is performed according to a given threshold, a gradient determination condition of the present disclosure is not limited to a threshold determination condition and may also be a function mapping determination condition. The threshold determination condition may include: being less than a given threshold, being greater than a given threshold, being within a given value range, or being outside a given value range. Moreover, a gradient determination condition, a compression determination condition, and an expansion determination condition of the present disclosure may be set as the same determination condition (in other words, all of them may be set as a threshold determination condition, where a threshold may be the same or different), and may also be set as different determination conditions (for instance, they may be set as threshold determination condition and mapping determination condition respectively, where a threshold and a mapping relation may also be different), which does not affect the implementations of the present disclosure.

The training device provided in the present disclosure may also be capable of supporting forward inference of a sparse neural network or a dense neural network, of which the process may be similar to the process of updating synapses. Therefore, the training device provided in the present disclosure can be used for accelerating training process of a whole neural network. In addition, the training device of the present disclosure can be applied not only in a fully connected layer and a convolutional layer of a neural network, but also in other layers.

All the modules of the training device provided in the present disclosure may be implemented in a form of hardware, where a physical implementation of the hardware may include, but is not limited to a physical component, where the physical component may include but is not limited to a transistor, a memristor, and a DNA computer.

An example of the present disclosure provides a chip including the training device provided in any of the above-mentioned examples.

An example of the present disclosure further provides a chip package structure including the chip provided in the example above.

Another example of the present disclosure provides a board card including the chip package structure provided in the example above.

Another example of the present disclosure provides an electronic device including the board card provided in the example above. The electronic device may include a data processing device, a robot, a computer, a printer, a scanner, a tablet, a smart terminal, a mobile phone, a driving recorder, a navigator, a sensor, a webcam, a cloud server, a camera, a video camera, a projector, a watch, an earphone, a mobile storage, a wearable device, a vehicle, a household appliance and/or a medical facility.

The vehicle may include an airplane, a ship and/or a car. The household appliance may include a television set, an air conditioner, a microwave oven, a refrigerator, a rice cooker, a humidifier, a washing machine, an electric lamp, a gas stove, and a range hood. The medical device may include a nuclear magnetic resonance instrument, a B-ultrasound machine, and/or an electrocardiograph.

Figure 18:
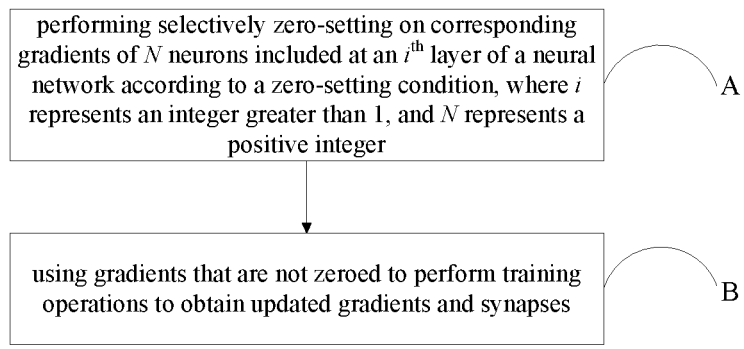
FIG. 18 is a flowchart of a sparse training method in an example of the disclosure.

FIG. 18 is a flowchart of a sparse training method provided in an example of the present disclosure. The sparse training method may include the following steps:

Step A: performing selectively zero-setting on corresponding gradients of N neurons included at an $i^{th}$ layer of a neural network according to a zero-setting condition, where i represents an integer greater than 1, and N represents a positive integer.

Step B: using gradients that are not zeroed to perform training operations to obtain updated gradients and synapses.

Alternatively, the zero-setting may be performed according to the specific function and algorithm involved in the operations, for instance selecting essential elements according to a certain rule using PCA (Principal Component Analysis), and setting other non-essential elements to zero.

Alternatively, the zero-setting condition may include: a zero-setting probability condition, a zero-setting threshold condition, or a zero-setting percentage condition. Alternatively, prior to performing zero-setting on the corresponding gradients of the selected neurons according to the zero-setting condition, the following may be further included: screening N neurons included at the $i^{th}$ layer in a random manner. Alternatively, the random manner may include: Gaussian random, Bayesian probabilistic random, or systematic sampling.

As an alternative example, when the zero-setting condition is a zero-setting probability condition where the zero-setting probability is p, N*p neurons may be selected by adopting the random manner. Corresponding gradients of the N*p neurons may be set to zero.

As an alternative example, when the zero-setting condition is a zero-setting threshold condition, the zero-setting threshold condition may be one of the following: being less than a given threshold, being greater than a given threshold, being within a given value range or being outside a given value range. For instance, the zero-setting threshold condition is set as being less than a given threshold, where the given threshold is th. If a gradient is less than the given threshold th, the gradient may be set to zero; otherwise, the gradient may remain unchanged.

As an alternative example, during a training process, the zero-setting threshold may be adjusted in a heuristic manner according to a heuristic condition. Alternatively, the heuristic manner may be: using test samples or verification samples to perform tests, comparing result information of at least two tests among a plurality of tests, where the result information may include accuracy or loss.

As an alternative example, a method of obtaining an accuracy difference may include: comparing the accuracy of a current test and the accuracy of a previous test to obtain an accuracy difference; or comparing the accuracy of a current test and the average accuracy of a plurality of previous tests to obtain an accuracy difference.

As an alternative example, the heuristic condition may be either a heuristic threshold determination condition or a heuristic mapping determination condition. Alternatively, the heuristic threshold determination condition may include: being less than a given threshold, being greater than a given threshold, being within a given value range, or being outside a given value range.

As an alternative example, the heuristic condition may be set as a heuristic threshold determination condition, if a difference of the accuracy obtained in a current test and the accuracy obtained in a previous test is greater than the heuristic threshold, the zero-setting threshold may be adjusted.

As an alternative example, the zero-setting threshold may be adjusted by using the Simulated Annealing algorithm, the Ant Colony Optimization algorithm, the Genetic algorithm, the List Searching algorithm, the Evolutionary Programming, or the Evolution Strategy.

As an alternative example, the zero-setting condition may be set as a zero-setting percentage condition, where the zero-setting percentage is q. Gradients of N neurons at the $i^{th}$ layer may be sorted according to a certain sorting rule. N*q neurons may be selected, and corresponding gradients of the neurons may be set to zero. Alternatively, the sorting rule may include: sorting by ascending order, sorting by descending order, or sorting by mapping. Alternatively, the rule for sorting by mapping is to sort gradients after taking the absolute values of the gradients.

As an alternative example, the method may further include: after sorting, selecting N*q neurons that are placed at a previous position, a subsequent position or a designated position.

As an alternative example, when using the sparse training method provided in the present disclosure to train a convolutional neural network in a neural network, training operations may be performed by using gradients that are not zeroed so as to obtain updated gradients and synapses.

Specifically, for a convolutional layer, an update amount of synapses may be obtained by accumulating the products of initial input neurons and un-zeroed gradients; for a fully connected layer, an update amount synapses may be obtained by multiplying initial input neurons by un-zeroed gradients; updated synaptic values may be obtained by accumulating initial synapses with the product of the update amount of synapse and a given learning rate; gradients of neurons at a previous layer, which is an $(i-1)^{th}$ layer may be obtained by accumulating the products of initial synapses and un-zeroed gradients.

As an alternative example, if no activation function exits at the $(i-1)^{th}$ layer of the convolutional neural network that performs sparse training, required gradients may be gradients of the $(i-1)^{th}$ layer obtained by operation; otherwise, the gradients of the $(i-1)^{th}$ layer obtained by operation may be multiplied by the derivative of the activation function, and the activated gradients obtained may be the required gradients.

An example of the present disclosure provides a processor, where the processor may include a storage unit and an operation unit. The processor may be capable of performing the sparse training method provided in any of the examples above. When a sparse training method provided in an above example is implemented to train a neural network, feedforward gradients of some neurons may be set to zero through a certain manner, so that synapses connected to the neurons do not update error values brought by the neurons, neurons at an upper layer that are connected to the above-mentioned neurons do not accumulate the error values brought by the neurons either. The amount of operation may thus be reduced, and the operation speed may be increased. The sparse training method may not be affected whether synapses are dense or sparse, and may not affect the normal operation and related improvements of a forward inference stage.

The disclosure further provides an example that illustrates the training of a neural network by using the sparse training method provided in the example above. For the convenience of the following description, relevant variables are explained herein. During a forward operation of a neural network, nin represents a known neuron, w represents synaptic data, and nout represents a result obtained. During a back operation, gradient represents a known gradient corresponding to nout, gradient' represents a corresponding gradient of nin obtained by operation, and w' represents synaptic data after operating and updating. In the present example, a feedforward gradient may be set to zero according to a given zero-setting probability. A fully connected layer is taken as an instance to explain a detailed training process, which is as follows:

assuming that a gradient gradient of an $i^{th}$ layer is known, updating a previous layer, which is a $(i-1)^{th}$ layer, to obtain the gradient gradient' and the synapse w' of the $(i-1)^{th}$ layer. Then assuming that the $i^{th}$ layer includes N neurons (nout) and a zero-setting probability is p. Using a random manner such as Gaussian random, Bayesian probabilistic random, systematic sampling, or the like, to randomly select [N*p] neurons (nout), and setting corresponding gradients of the neurons to zero. Then performing operations by multiplying the known neurons (nin) by gradient to obtain an update amount of synapse. Multiplying the update amount by a given learning rate, and accumulating the product with the initial synapse w to obtain the updated synaptic value w'. Accumulating the products of the initial synapse w and gradient to obtain a corresponding gradient of the neurons (nin) at the previous layer, which is the $(i-1)^{th}$ layer. If no activation function exists at the $(i-1)^{th}$ layer, required gradients gradient' may be gradients obtained by operations; if an activation function exists, multiplying the gradients obtained by operations and the derivative of the activation function, the activated gradients obtain may be the required gradients gradient'. The method may be applied in a whole training process of a neural network, or in a training process of some layers of the neural network.

Alternatively, when using the sparse training method above to train a convolutional layer, an update amount of synapse may be obtained by accumulating the products of initial input neurons and un-zeroed gradients.

The present disclosure further provides another example illustrating training a neural network by using the sparse training method provided in the example above. For convenience of the following description, relevant variables are explained here. During forward operation of a neural network, nin represents a known neuron, w represents synaptic data, nout represents an obtained result. During a back operation, gradient represents a corresponding gradient of nout, which is known, gradient' represents a corresponding gradient of nin obtained by operation, and w' represents synaptic data after operating and updating. In the present example, a threshold is given. A feedforward gradient may be set to zero according to the threshold given by a user, then the threshold may be adjusted in a heuristic manner. A fully connected layer is taken as an instance to explain a detailed training process, which is as follows:

assuming that a gradient of an $i^{th}$ layer is known, updating a previous layer, which is a $(i-1)^{th}$ layer, to obtain a gradient gradient' and a synapse w' of the $(i-1)^{th}$ layer. Assuming a zero-setting threshold is th. Determining sequentially whether the absolute value of each gradient is less than th. If the absolute value of each gradient is less than th, setting the value to zero, otherwise, keeping gradient unchanged. Then performing operations by multiplying known initial neurons (nin) by gradient to obtain an update amount of synapse, multiplying the update amount by a given learning rate, then accumulating the product with the initial synapse w to obtain an updated synaptic value w'. Multiplying the initial synapse w and gradient to obtain a corresponding gradient of neurons (nin) at the previous layer: $(i-1)^{th}$ layer. If no activation function exists at the $(i-1)^{th}$ layer, required gradients gradient' may be the gradients obtained by operations; if an activation function exists at the $(i-1)^{th}$ layer multiplying the gradients obtained by operations and the derivative of the activation function, the activated gradients obtained may be the required gradient'. The method may be applied in a whole training process of a neural network, or in a training process of some layers of the neural network.

Alternatively, when using the sparse training method above to train a convolutional layer, an update amount of synapse may be obtained by accumulating the products of initial input neurons and un-zeroed gradients.

It should be understood that, during a training process, a simple heuristic manner may be used for adjusting a threshold. In other words, a heuristic condition is given in a training process, and the threshold may be adjusted when the heuristic condition is met. It is assumed that a heuristic condition is that when a current model is tested periodically using test samples (or verification samples), the threshold may be adjusted, for instance, being reduced by 10% (all the specific numbers can be adjusted) if a loss obtained from comparing the accuracy of the present test and the accuracy of a previous test is greater than a threshold, or if the average accuracy of consecutive tests is greater than a given threshold. The heuristic condition herein may further be that the loss obtained by comparing the accuracy of a new test and the accuracy of a previous test is within a given range, or that the loss obtained by comparing average accuracies of a plurality of consecutive tests is greater than a given threshold. In addition, other common heuristic algorithms may also be used, such as the Simulated Annealing algorithm, the Ant Colony Optimization algorithm, the Genetic algorithm, the List Searching algorithm, the Evolutionary Programming, and the Evolution Strategy, so as to determine whether and how to adjust a zero-setting threshold.

The present disclosure further provides another example showing using the sparse training method provided in the above example to train a neural network. For the convenience of the following description, relevant variables are explained herein. During forward operation of a neural network, nin represents a known neuron, w represents synaptic data, nout represent a result obtained. During back operation, gradient represents a known corresponding gradient of nout, gradient' represents a corresponding gradient of nin obtained by operations, and w' represents synaptic data after operating and updating. In the present example, a manner of zero-setting percentage may be used. A feedforward gradient may be set to zero according to a zero-setting percentage given by a user. A fully connected layer is taken as an instance to explain a detailed training process, which is as follows:

assuming that a gradient gradient of an $i^{th}$ layer is known, updating a previous layer, which is a $(i-1)^{th}$ layer, to obtain a gradient gradient' and a synapse w' of the $(i-1)^{th}$ layer. Then assuming that the $i^{th}$ layer includes N neurons (nout), and a zero-setting percentage is q. Sorting gradients by following a certain sorting rule. The sorting rule may include: sorting in ascending order, in descending order, or in mapping order, where sorting in the mapping order is sorting gradients after taking the absolute values of the gradients. In the present disclosure, for instance, the absolute values of gradients may be sorted by following ascending order; then the first [N*q] gradients, which are [N*q] neurons (nout) whose absolute values are relatively small, may be set to zero, where, after sorting, [N*q] neurons at the rear or at a designated position may be selected according to different sorting rules, and others may remain unchanged. Then performing operations by multiplying the known initial neurons (nin) and gradient to obtain an update amount of synapse, multiplying the update amount by a given learning rate, and accumulating the product with the initial synapse w to obtain an updated synaptic value w'. Accumulating the products of the initial synapse w and gradient to obtain gradients of the neurons (nin) at the previous layer $(i-1)^{th}$ layer. If no activation function exists at the $(i-1)^{th}$ layer, required gradients gradient' may be the gradients obtained by operations; if an activation function exists at the $(i-1)^{th}$ layer, multiplying gradients obtained by operations and the derivative of the activation function, and the activated gradients obtained may be the required gradient'. The method may be applied in a whole training process of a neural network, or in a training process of some layers of the neural network.

Alternatively, when using the sparse training method above to train a convolutional layer, an update amount of synapse may be obtained by accumulating the products of initial input neurons and un-zeroed gradients.

A processor is provided in an example of the present disclosure. The processor may include a storage unit and an operation unit, and may be capable of performing a sparse training method provided in any of the examples above.

Alternatively, the processor may include a general-purpose microprocessor, an instruction set processor and/or a related chip set and/or a special-purpose microprocessor (e.g., ASIC). The processor may further include an onboard memory for caching purposes. Optionally, a special-purpose neural network processor may be used.

An example of the present disclosure provides a chip including the neural network processor provided in any of the above-mentioned examples.

An example of the present disclosure further provides a chip package structure including the chip provided in the example above.

Another example of the present disclosure provides a board card including the chip package structure provided in the example above.

Another example of the present disclosure provides an electronic device including the board card provided in the example above. The electronic device may include a data processing device, a robot, a computer, a printer, a scanner, a tablet, a smart terminal, a mobile phone, a driving recorder, a navigator, a sensor, a webcam, a cloud server, a camera, a video camera, a projector, a watch, an earphone, a mobile storage, a wearable device, a vehicle, a household appliance, and/or a medical facility.

The vehicle may include an airplane, a ship and/or a car. The household appliance may include a television set, an air conditioner, a microwave oven, a refrigerator, a rice cooker, a humidifier, a washing machine, an electric lamp, a gas stove, and a range hood. The medical device may include a nuclear magnetic resonance instrument, a B-ultrasound machine, and/or an electrocardiograph.

Figure 19:
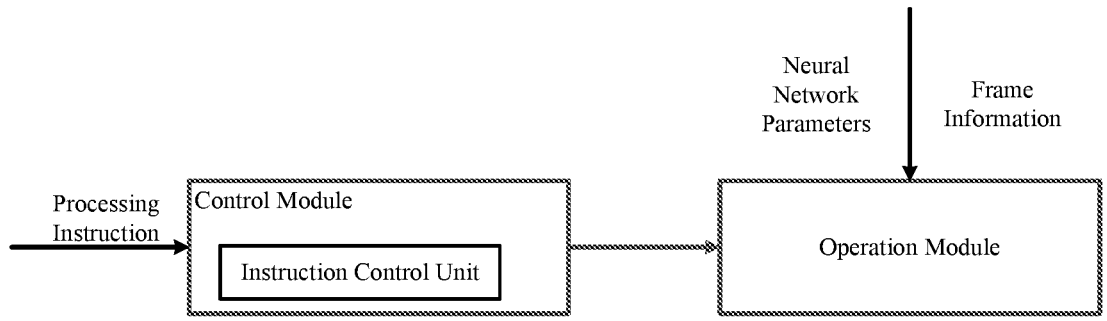
FIG. 19 is a structural diagram of a processor in an example of the disclosure.

FIG. 19 is a structural diagram of a processor provided in an example of the disclosure. The processor may include a control module and an operation module, where an instruction control unit of the control module may be configured to fetch processing instructions to control the operation module, and the operation module may be configured to receive frame information, neural network parameters, the processing instructions, and may be configured to perform neural network operations on the frame information and the neural network parameters according to the processing instructions.

As an alternative example, the processor may further include: a storage module configured to store frame information and neural network parameters, where the frame information may include complete frame information and reference frame information, and the neural network parameters may include neurons, weights, topological structures and/or processing instructions.

As an alternative example, the operation module of the processor may include: an accurate operation unit configured to fetch complete frame information and weights in the neural network parameters, perform neural network operations to obtain a first operation result and transfer the first operation result to the storage module; an approximate operation unit configured to fetch reference frame information and the operation result of the reference frame which is obtained in advanced and stored in the storage module, then perform approximate operations to obtain a second operation result and transfer the second operation result to the storage module. Alternatively, the neural network operations performed by the operation module may include multiplication, addition, activation function operations and/or pooling operations.

As an alternative example, the accurate operation unit of the operation module may include: a multiplier configured to perform the multiplication; and/or one or more adders configured to perform the addition; and/or an activation function unit configured to perform the activation function operations. Alternatively, the one or more adders may form an adder tree.

As an alternative example, the activation functions employed by the activation function operations may include sigmoid, tanh, ReLU, softmax, Leaky ReLU and/or Maxout; the pooling operations may include mean-pooling, max-pooling, median-pooling, Rot pooling and/or reverse pooling.

As an alternative example, the processor may further include: a decoding module configured to decompress compressed videos, fetch frame information from each video frame, then divide the frame information into complete frame information and reference frame information, and store the complete frame information and the reference frame information in the storage module.

As an alternative example, the reference frame information may include reference frame information that refers to encoding of a previous frame and/or reference frame information that refers to encodings of a previous frame and a subsequent frame.

As an alternative example, the decoding module is further configured to assign a flag bit to each piece of frame information, where complete frame information is marked as I frame, reference frame information that refers to encoding of a previous frame is marked as P frame, reference frame information that refers to encodings of a previous frame and a subsequent frame is marked as B frame.

As an alternative example, when reference information is reference frame information that refers to encoding of a previous frame, the decoding module may further be configured to mark the previous reference frame of the frame and/or displacement of the frame compared with the previous reference frame; when reference information is reference frame information that refers to encodings of a previous frame and a subsequent frame, the decoding module may further be configured to mark the previous reference frame and the subsequent reference frame of the frame and/or displacements of the frame compared with the previous reference frame and the subsequent reference frame.

As an alternative example, the processor may further include: an encoding module that may be connected to the instruction control unit of the control module and the operation module, and may be configured to encode the processing instruction and transfer the encoded processing instruction to the operation module, where the operation module may then perform neural network operations on the frame information and the neural network parameters according to the encoded processing instruction.

Figure 20:
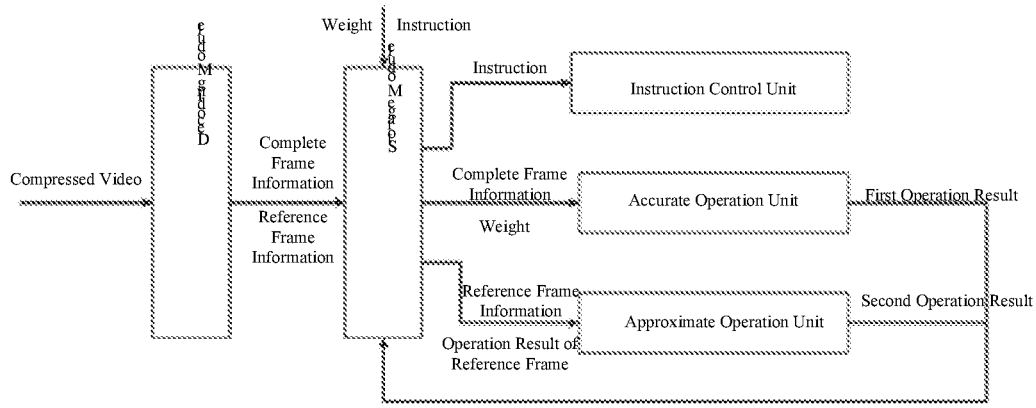
FIG. 20 is a structural diagram of a processor in another example of the disclosure.

An example of the present disclosure provides a processor. FIG. 20 shows a structure of the processor. The processor may include a storage module, a control module, an accurate operation unit, and an approximate operation unit, where:

the storage module may be configured to store complete frame information, reference frame information, and neural network parameters; the neural network parameters may include neurons, weights, topological structures, and processing instructions; the instruction control unit of the control module may be configured to fetch processing instructions and decode the processing instructions to control the accurate operation unit and the approximate operation unit; the accurate operation unit may be configured to fetch complete frame information and weights to perform neural network operations to obtain a first operation result, then transfer the first operation result to the storage module for storing; the approximate operation unit may be configured to fetch reference frame information and the operation result of reference frame pre-stored in the storage module to perform approximate operations to obtain a second operation result, and transfer the second operation result to store the storage module.

Alternatively, the accurate operation unit may perform neural network operations according to complete frame information and weights of a frame marked as I frame to obtain a first result, and transfer the first result to the storage module for storing, so that the first result may be used as an operation reference of the approximate operation unit and part of a result obtained by the whole processor.

Alternatively, the accurate operation unit may include, but is not limited to, three sections. A first section may include one or more multipliers; a second section may include one or more adders, and optionally, the second section may include one or more adders where the adders may form an adder tree; a third section is an activation function unit. The first section may multiply input data 1 (in1) by input data 2 (in2) to obtain an output (out), and the process is as follows: out=in1*in2. The second section may add in1 level by level in an adder tree to obtain output data (out), where in1 is a vector with a length of N, N is greater than 1, and the process is as follows: out=in1[1]+in1[2]+ . . . +in1[N]; and/or the second section may accumulate input data (in1) through the adder tree, then add the accumulation result and input data (in2) to obtain output data (out), and the process is as follows: out=in1[1]+in1[2]+ . . . +in1[N]+in2; or the second section may add input data (in1) and input data (in2) to obtain output data (out), and the process is as follows: out=in1+in2. The third section may perform activation function (active) operations on input data (in) to obtain an activated output data (out), and the process is as follow: out=active(in), where the activation function (active) may be sigmoid, tanh, relu, softmax, and the like. In addition to activation operations, the third section may also be capable of realizing other non-linear functions. The third section can perform operations (f) on input data (in) to obtain output data (out), the process is as follows: out=f(in).

Alternatively, the accurate operation unit may also include a pooling unit. The pooling unit may perform pooling operations on input data (in) to obtain output data (out) after being pooled, and the process is as follows: out=pool(in), where pool represents a pooling operation. The pooling operation may include, but is not limited to mean-pooling, max-pooling, median-pooling. As mentioned above, input data (in) is the data in a pooling kernel related to output data (out).

As an alternative example, the accurate operation unit may include several sections. A first section may multiply input data 1 by input data 2 to obtain a result; a second section may perform adder tree operations where input data 1 may be added level by level in the adder tree, or input data 1 may be added to input data 2 to obtain a result; a third section may perform activation function operations, where the third section may perform activation function (active) operations on input data to obtain output data. Operations performed by the above-mentioned sections may be freely combined to achieve operations of different functions.

Alternatively, the approximate operation unit may fetch reference frame information marked as P frame and/or B frame, displacement information, and a pre-obtained operation result of a marked previous reference frame and/or marked previous and subsequent reference frames. The approximate operation unit may output a second operation result through a behavior prediction approximate operation, then transfer the second operation result to the storage module as another part of the result obtained by the whole processor. The pre-obtained operation result of the previous reference frame and/or the previous and subsequent reference frames may be a first operation result or a second operation result.

The processor provided in the present disclosure may be used for high-speed video processing by using a neural network. The processor may be capable of fetching all frames from a video as well as behavior prediction information of each frame, using an operation module that corresponds to the type of a frame and behavior prediction information to perform operations, and for some of the frames, performing approximate operations to reduce an amount of operations so that the time and power consumption for video processing may be decreased.

Figure 21:
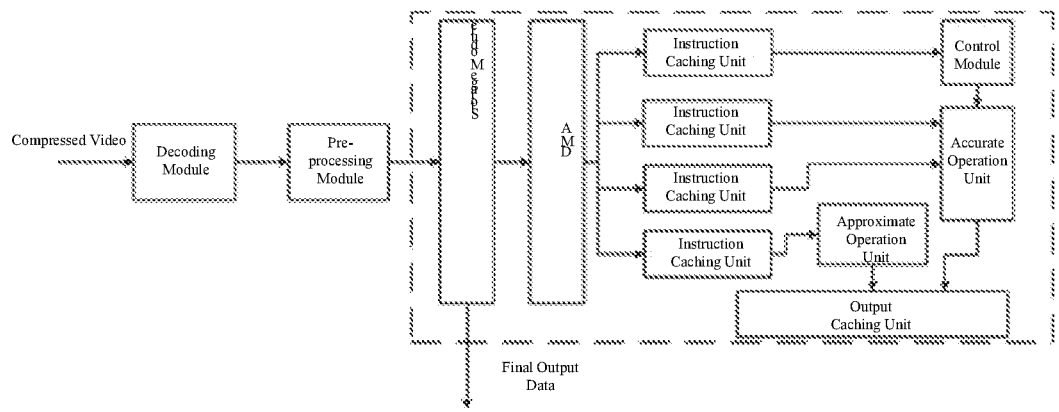
FIG. 21 is a structural diagram of a processor in an example of the disclosure.

Another example of the present disclosure provides a processor as shown in FIG. 21. The processor may include a decoding module, a storage module, a control module, an operation module, where the operation module may include: an accurate operation unit and an approximate operation unit; the control module may include an instruction control unit.

The decoding module may be configured to decompress videos, fetch the type and behavior prediction information of each of the frames from a video and transfer to the storage module. The storage module may be configured to store complete frame information, reference frame information, and neural network parameters. The neural network parameters may include neurons, weights, topological structures, and processing instructions.

The instruction control unit may receive instructions stored in the storage module, decode and generate control information to control the accurate operation unit and the approximate operation unit to perform operations.

The accurate operation unit may receive complete frame information and neural network weights, perform neural network operations to obtain a first operation result and transfer the first operation result to the storage module.

The approximate operation unit may receive reference frame information, displacement information, and a pre-obtained operation result of a reference frame, perform a behavior prediction approximate operation to obtain a second operation result, then transfer the second operation result to the storage module. The pre-obtained operation result of a reference frame may be the first operation result or the second operation result.

The processor further may include a pre-processing module which is located between the decoding module and the storage module. The pre-processing module may be configured to pre-process raw data, where the pre-processing may include partition, Gaussian filter, binarization, regularization, normalization, and the like.

The processor may also include an instruction caching unit, a complete frame caching unit, a weight caching unit, a reference frame caching unit, an output operation result caching unit, and may further include a weight address caching unit (not shown in the figure). The instruction caching unit may be configured to store dedicated instructions; the complete frame caching unit may be configured to store complete frame information; the weight caching unit may be configured to store neural network weight data; the reference frame caching unit may be configured to store reference frame information, where the reference frame information may include reference frame information of P frame and/or B frame, displacement information and a pre-obtained operation result of a marked previous reference frame and/or marked previous and subsequent reference frames; the output operation result caching unit may be configured to store output of an operation unit, where the output may include a first operation result and a second operation result.

The processor may further include DMA (Direct Memory Access). DMA may be configured to read and write data or instructions between the storage module, the instruction caching unit, the weight caching unit, the complete frame caching unit, the reference frame caching unit, and the output operation result caching unit.

It should be noted that in the processor provided in the present example, the components except for the decoding module and the pre-processing module may be integrated as an artificial neural network operation module, and may be further integrated into an artificial neural network chip.

All the units of the processor provided in the present example may be implemented in hardware, where a physical implementation of the hardware may include, but is not limited to a physical component. The physical component may include, but are not limited to a transistor, a memristor and, a DNA computer.

An example of the disclosure further provides a method for processing data using the processor of the above-mentioned example, and the method may include the following steps:

Step C: fetching a processing instruction by the instruction control unit to control the operation module.

Specifically, the instruction control unit may fetch a processing instruction stored in the storage module, and decode the processing instruction to control the accurate operation unit and the approximate operation unit.

Step D: receiving, by the operation module, frame information, neural network parameters and the processing instruction, and performing neural network operations on the frame information and the neural network parameters according to the processing instruction.

Specifically, the accurate operation unit of the operation module may fetch complete frame information and weights, perform neural network operations to obtain a first operation result, then transfer the first operation result to the storage module for storing. The approximate operation unit of the operation module may fetch reference frame information and a pre-obtained operation result of a reference frame, perform approximate operations to obtain a second operation result, and transfer the second operation result to the storage module for storing.

As an alternative example, prior to the Step C, the method may further include:

decompressing a compressed video by the decoding module, fetching frame information of each frame of the video, dividing the frame information into complete frame information and reference frame information, and transferring the complete frame information and the reference frame information to the storage module for storing.

Alternatively, the neural network operation may include multiplication, addition, activation function operations, and/or pooling operations. Alternatively, the accurate operation unit may include: a multiplier configured to perform multiplication, and/or one or more adders configured to perform addition, and/or an activation function unit configured to perform activation function operations. Alternatively, the one or more adders may form an adder tree.

As an alternative example, the activation functions employed by the activation function operation may include sigmoid, tanh, ReLU, softmax, Leaky ReLU, and/or Maxout; the pooling operations may include mean-pooling, max-pooling, median-pooling, RoI pooling, and/or reverse pooling.

As an alternative example, the reference frame information may include the reference frame information that refers to the encoding of a previous frame and/or the reference frame information that refers to the encodings of a previous frame and a subsequent frame.

As an alternative example, the decoding module may further be configured to assign a flag bit to each piece of frame information, where complete frame information may be marked as I frame, reference frame information that refers to encoding of a previous frame may be marked as P frame, reference frame information that refers to encodings of a previous frame and a subsequent frame may be marked as B frame.

As an alternative example, for reference frame information that refers to the encoding of a previous frame, the decoding module may further be configured to mark the previous reference frame of the frame and/or displacement of the frame compared with the previous reference frame; for reference frame information that refers to the encodings of a previous and a subsequent frames, the decoding module may further be configured to mark the previous reference frame and the subsequent reference frame of the frame and/or displacements of the frame compared with the previous and subsequent reference frames.

As an alternative example, the decoding module which is located between the instruction control unit and the operation module, may be capable of decoding processing instructions and transferring the decoded processing instructions to the operation module. Then the operation module may perform neural network operations on frame information and neural network parameters according to the decoded processing instructions.

The processor provided in the example above may include a video decoding module, a storage module, an instruction control unit, an accurate operation unit, and an approximate operation unit, where neural network parameters including processing instructions and weights are pre-stored in the storage module. The method of using the processor to process data may include the following steps: S1: decompressing a compressed video, by the video decoding module, fetching frame information of each frame of the video, and dividing frame information into complete frame information and reference frame information.

S2: storing, by the storage module, the complete frame information and the reference frame information divided by the video decoding module.

S3: fetching, by the instruction control unit, a processing instruction from the storage module, and decoding the processing instruction to control the accurate operation unit and the approximate operation unit.

S4: fetching, by the accurate operation unit, the complete frame information and a weight to perform neural network operations, obtaining a first operation result and transferring the first operation result to the storage module.

S5: fetching, by the approximate operation unit, the reference frame information and an operation result of a reference frame to perform approximate operations, obtaining a second operation result and transferring the second operation result to the storage module.

S6: storing, by the storage module, the first and the second operation results, and finishing the video processing.

In an example, the processor may be applied to an accelerated device for accelerating object recognition in a video. Detailed steps may include:

First, fetching, by the decoding module, frame information of each frame of a video while decompressing the video, and dividing the frame information into three types: I frame (complete encoded frame information), P frame (frame information generated by referring previous I frame and only includes encoding of differences), and B frame (frame information referring encodings of a previous and a subsequent frames)

Then, the decoding module may assign a flag bit to each piece of frame information of the video to mark a frame type. For P frame, the decoding module may also mark a previous reference frame of the P frame, and for B frame, the decoding module may also mark a previous reference frame and a subsequent reference frame of the B frame.

The decoding module may be configured to transfer marked I frames, P frames, B frames to the storage module for storing.

The storage module may further be configured to store neurons (in other words, each frame), weights, instructions, and frame information (in other words, information of I frame, information of P frame, a marked previous reference frame of P frame, a displacement of P compared with the previous reference frame, information of B frame, marked previous and subsequent reference frames of B frame, and displacements of B frame compared with the previous and subsequent reference frames) of a neural network.

The instruction control unit may receive the instructions stored in the storage module, decode the instructions to generate control information, and control the accurate operation unit and the approximate operation unit to perform operations.

The accurate operation unit may fetch the information of I frame and the weights, complete the neural network operation, output neurons, and transfer the neurons to the storage module.

The approximate operation unit may fetch the information of P frame and an operation result of a previous reference frame obtained by the accurate operation unit, and directly output the operation result of the previous reference frame without performing any operation; the approximate operation unit may fetch frame information of B frame and a pre-obtained operation result of marked previous and subsequent reference frames, output the geometric mean (or the arithmetic mean) of the operation result of the previous and subsequent reference frames, and transfer the output result to the storage module.

If the processor provided in the example above includes a decoding module, a storage module, an instruction control unit, an accurate operation unit, and an approximate operation unit, the processor may be implemented in:

an accelerated device configured to accelerate objects in videos. A detailed process is as follows:

First, fetching, by the decoding module, frame information of each frame of a video while decompressing the video. The frame information of the video may be divided into three types: I frame (complete encoded frame information), P frame (frame information generated by referring previous I frame and only includes encoding of differences) and B frame (frame information referring encodings of a previous and a subsequent frames).

Assigning, by the decoding module, a flag bit to each piece of frame information to mark a frame type. For P frame, the decoding module may further be configured to mark a previous reference frame of the P frame and fetch a predicted displacement of an object in the P frame compared with the reference frame; for B frame, the decoding module may be configured to mark a previous reference frame and a subsequent reference frame of the B frame, and fetch a predicted displacement of an object in the B frame compared with the previous reference frame and a predicted displacement compared with the subsequent reference frame.

Transferring, by the decoding module, marked I frame, P frame, the displacement of the P frame compared with the previous frame, B frame, the displacements of the B frame compared with the previous and subsequent reference frames to the storage module.

Further, storing, by the storage module, neurons (in other words, each frame), weights, instructions, and frame information (in other words, frame information of I frame; frame information of P frame, marked previous reference frame of P frame, the displacement of P frame compared with the previous reference frame, frame information of B frame, marked previous and subsequent reference frames of B frame, and the displacement of B frame compared with the previous and subsequent reference frames) of a neural network.

Receiving, by the instruction control unit, the instructions stored in the storage module, decoding the instructions to generate control information, and controlling the accurate operation unit and the approximate operation unit to perform operations.

Fetching, by the accurate operation unit, the information of I frame and the weights, performing the neural network operation to output neurons, and transferring the neurons to the storage module.

Fetching, by the approximate operation unit, P frame, an operation result of a previous reference frame of the P frame, and the displacement of the P frame compared with the previous reference frame, adding the pre-obtained operation result of the marked previous reference frame and the displacement, then outputting the sum. The approximate operation unit may further receive the B frame, pre-obtained operation results of the marked previous reference frame and marked subsequent reference frames, and the displacements of the B frame compared with the previous and subsequent reference frames, then add the geometric mean (or the arithmetic mean) of the operation results of the previous and subsequent reference frames and the geometric mean of the displacements of the frame B compared with the previous and subsequent reference frames, and finally transferring output neurons to the storage module.

All the units of the processor provided in the present disclosure may be implemented in hardware, where a physical implementation of the hardware may include, but is not limited to a physical component. The physical component may include, but are not limited to a transistor, a memristor, and a DNA computer.

An example of the present disclosure provides a chip including the processor provided in the above-mentioned example.

An example of the present disclosure further provides a chip package structure including the chip provided in the example above.

Another example of the present disclosure provides a board card including the chip package structure provided in the example above.

Another example of the present disclosure provides an electronic device including the board card provided in the example above. The electronic device may include a data processing device, a robot, a computer, a printer, a scanner, a tablet, a smart terminal, a mobile phone, a driving recorder, a navigator, a sensor, a webcam, a cloud server, a camera, a video camera, a projector, a watch, an earphone, a mobile storage, a wearable device, a vehicle, a household appliance, and/or a medical facility.

The vehicle may include an airplane, a ship, and/or a car. The household appliance may include a television set, an air conditioner, a microwave oven, a refrigerator, a rice cooker, a humidifier, a washing machine, an electric lamp, a gas stove, and a range hood. The medical device may include a nuclear magnetic resonance instrument, a B-ultrasound machine, and/or an electrocardiograph.

Figure 22:
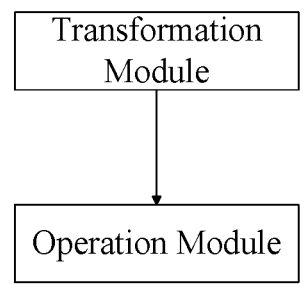
FIG. 22 is a structural diagram of an operation device in an example of the disclosure.

FIG. 22 is a structural diagram of an operation device provided in an example of the disclosure. The operation device may include:

a transformation module configured to perform spatial transformation on input data and/or parameter matrices from first geometric space into second geometric space; and an operation module connected to the transformation module and may be configured to receive transformed input data and parameter matrices and perform operations. Alternatively, input of the operation device may include images, videos, audio, texts, and the like. Output of the operation device may be numerical output, and the output represents, but is not limited to, a classification result, a generation result, and the like.

As an alternative example, input data and parameter matrices may be represented by a linear combination of second geometric space basis vector, which in other words, refers to that input data and parameter matrices may be expanded in the second geometric space.

As an alternative example, the input data and the parameter matrices may be input data and parameter matrices used by a convolutional layer, a down-sampling layer, a normalization layer, or a regularization layer.

As an alternative example, the first geometric space may be a spatial domain, and the second geometric space may be a frequency domain.

As an alternative example, the manner of the spatial transformation may be an invertible spatial transformation, including FFT, DFT, DCT, or DST.

As an alternative example, the operation module of the operation device may include: a multiplier configured to multiply input data to obtain an output; and/or one or more adders configured to add input data to obtain an output.

Alternatively, the plurality of adders may form an adder tree configured to perform adder tree operations, which in other words, refers to that the adder tree may be configured to add input data level by level to obtain output data.

As an alternative example, the operation module of the operation device may further include: an activation function unit configured to perform activation function operations on input data which is input into the activation function unit to obtain activated output data, where the activation function may include sigmoid, tanh, ReLU, or softmax.

As an alternative example, the operation module of the operation device may further include: a pooling unit configured to perform pooling operations on input data which is input into the pooling unit to obtain output data after being pooled; the pooling operation may include: mean-pooling, max-pooling, or median-pooling.

As an alternative example, the operation device may further include: a storage module configured to store data and instructions; and a control module configured to control the operation module to perform corresponding operations.

As an alternative example, the storage module of the operation device may include: a weight caching unit, an input neuron caching unit, an output neuron caching unit, and an instruction caching unit.

As an alternative example, the operation device may further include: optimization module configured to perform optimization operations on transformed input data and/or parameter matrices, where the optimization operation may include component selecting, quantifying, sparsification, or compressing.

As an alternative example, the optimization module of the operation device may perform a component selection according to a component selection condition through PCA (Principal component analysis). Alternatively, the component selection condition may include a threshold condition, which in other words, means that with a given threshold, if the absolute value of the coefficient of a component is greater than the threshold, the component may be retained; otherwise, if the absolute value of the coefficient of a component is less than the threshold, the component may be deleted; or a quantity condition, which in other words, means that with a given quantity for selection, components that satisfy the quantity may be selected according to a descending order of coefficients of the components.

Figure 23:
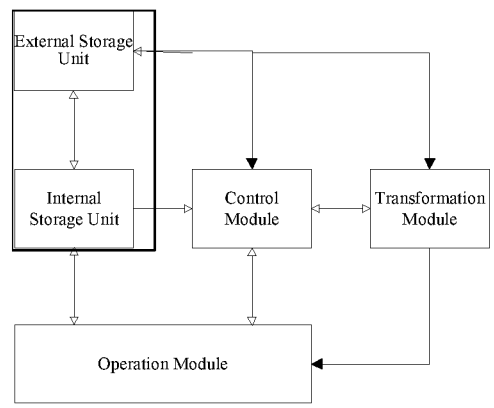
FIG. 23 is a structural diagram of an operation device in an example of the disclosure.

FIG. 23 is a structural diagram of an operation device in an example of the disclosure. The operation device may include: a transformation module that may be configured to perform spatial transformation on input data and/or parameter matrices from first geometric space into second geometric space; and an operation module connected to the transformation module, and may be configured to receive transformed input data and parameter matrices and perform operations. The operation device further may include an external storage unit, an internal storage unit, and a control module.

The external storage unit may be configured to store part or all data information of the operation module, the internal storage unit, and the control module. The data information may include: weight data, neuron data (including input), instruction data, transformation information, and the like. The external storage unit can further provide a read/write interface for external memories, and can be configured with a related register to flexibly realize operations on different external memories.

The internal storage unit may be configured to store data for the operation module, including weights, neurons (including input), instruction data, and the like. The internal storage unit can further provide a read/write interface for external storage modules to realize data exchange between an internal storage module and an external storage module.

The control module may provide an interface for exchanging of control signals with the external storage module, and may be used for receiving and analyzing external control signals to control other modules; the control module may also provide a signal exchange interface for the operation module, and may be used for controlling operation signals to complete different operations. The control module may further provide a single exchange interface for the transformation module, and may be used for sending signals to the transformation module to control the transformation function. Input data and parameter matrices that are transformed by the transformation module may be directly sent to the operation module for operating, or may be sent to the operation module for operating via the external and internal storage modules.

Alternatively, input of the operation device may include images, videos, audio, texts, and the like. Output of the operation device may be numerical output, where the output represents, but is not limited to, classification result and generation result.

As an alternative example, operations performed by the operation module in the operation device may include neural network operations.

Alternatively, the operation module may include: a multiplier configured to multiply input data to obtain an output; and/or one or a plurality of adders configured to add input data to obtain an output. Further, the plurality of adders may form an adder tree configured to perform adder tree operations, which in other words, refers to that the adder tree may be configured to add input data level by level to obtain output data.

As an alternative example, the operation module may include, but is not limited to: a first multiplier section, a second adder tree section, a third activation function unit section, and/or a fourth pooling unit section. The first multiplier section may multiply input data 1 (in1) by input data 2 (in2) to obtain an output (out), and the process is as follows: out=in1*int. The second adder tree section may add input data in1 level by level in the adder tree to obtain output data (out), where in1 is a vector with a length of N, N is greater than 1, and the process is as follows: out=in1[1]+in1[2]+ . . . +in1[N]; and/or, input data (in1) may be accumulated in the adder tree and then the accumulation result may be added with input data (in2) to obtain output data (out), and the process is as follows: out=in1[1]+in1 [2]+ . . . +in1[N]+in2; or input data (in1) may be added with input data (in2) to obtain output data (out), and the process is as follows: out=in1+in2. The third activation function unit section may perform activation function (active) operations on input data (in) to obtain an activated output data (out), and the process is as follow: out=active (in), where the activation function (active) may be sigmoid, tanh, relu, softmax, and the like; in addition to activation operations, the third activation function unit section may also be capable of realizing other non-linear functions, for instance, the third activation function unit section can perform operations (f) on input data (in) to obtain output data (out), and the process is as follows: out f(in). The pooling unit may perform pooling operations on input data (in) to obtain output data (out) after being pooled, and the process is as follows: out=pool(in), where pool is a pooling operation, and the pooling operation may include, but is not limited to: mean-pooling, max-pooling, and median-pooling; and input data (in) is the data in a pooling kernel related to output data (out).

Correspondingly, the operation module performing operations may include: multiplying input data 1 by input data 2 by the first multiplier section to obtain data; and/or performing adder tree operations by the second adder tree section to add input data 1 level by level through the adder tree, or to add input data 1 and input data 2 to obtain output data; and/or performing activation function operations by the third activation function unit section to perform activation function (active) operations on input data to obtain output data; and/or performing pooling operations by the fourth pooling unit section, where the process is out=pool(in), and pool represents a pooling operation that may include, but is not limited to: mean-pooling, max-pooling, median-pooling; input data in is the data in a pooling kernel related to output data out. The operations of one or more of the sections among the above-mentioned sections may be performed with different orders to realize operations of different functions.

Figure 24:
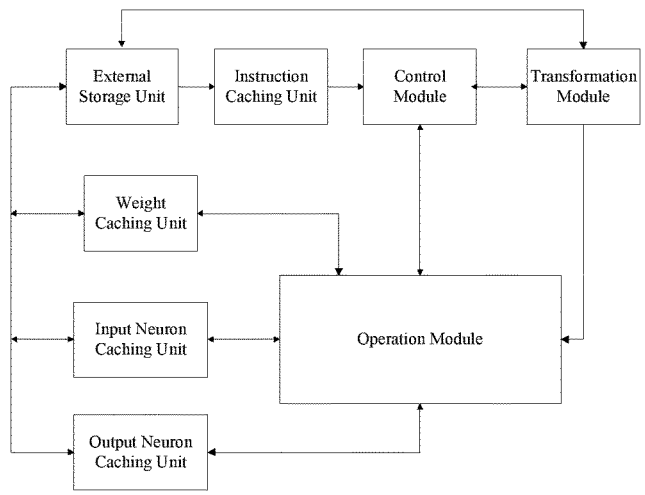
FIG. 24 is a structural diagram of an operation device in an example of the disclosure.

Moreover, referring to FIG. 24, the internal storage module of the operation device of the present disclosure may further include: an instruction caching unit, an input neuron caching unit, an output neuron caching unit, and a weight caching unit. The instruction caching unit may be configured to cache instructions; the weight caching unit may be configured to cache weight data; the input neuron caching unit may be configured to cache input neurons; the control module may further be configured to read instructions from the instruction caching unit, decode the instructions into instructions that can be performed by the operation module and then output to the operation module; and the output neuron caching unit may be configured to cache operations results output by the operation module, and transfer the operation results to the external storage module.

The disclosure provides an operation method including:

performing spatial transformation on input data and/or parameter matrices from first geometric space into second geometric space; and performing operations on the transformed input data and parameter matrices.

As an alternative example, the representing input data or parameter matrices by employing a linear combination of the basis vector of the second geometric space through spatial transformation may refer to that, the input data and parameter matrices may be expanded in the second geometric space.

As an alternative example, the input data and the parameter matrices may be input data and parameter matrices used by a convolutional layer, a down-sampling layer, a normalization layer, or a regularization layer.

As an alternative example, the first geometric space may be a spatial domain, and the second geometric space may be a frequency domain.

As an alternative example, the manner of the spatial transformation may be an invertible spatial transformation, including FFT, DFT, DCT, or DST.

As an alternative example, the performing operations on the transformed input data and parameter matrices may include: obtaining the linear combination representation of the parameter matrices in the second geometric space according to the obtained transformed parameter matrices, which in other words, refers to that the parameter matrices may be represented by a linear combination of the space basis vector of the second geometric space; and coupling and operating the spatially transformed input data and the space basis vector.

As an alternative example, before the performing operations on the transformed input data and parameter matrices, the method may further include: performing optimization operations on input data and/or parameter matrices in the transformation space, where the optimization operation may include at least one of the following: component selecting, quantifying, sparsification, or compressing.

As an alternative example, the optimization operation is performing a component selection according to a component selection condition through PCA. Alternatively, the component selection condition may include a threshold condition, which in other words, refer to that with a given threshold, if the absolute value of the coefficient of a component is greater than the threshold, the component may be retained; otherwise, if the absolute value of the coefficient of a component is less than the threshold, the component may be deleted; or a quantity condition, which in other words, means that with a given quantity for selection, components that satisfy the quantity may be selected according to a descending order of coefficients of the components.

As an alternative example, the performing operations on the transformed input data and parameter matrices may include: multiplication, addition, multiply-add operations, inner product operations, non-linear operations, or convolution operations.

As an alternative example, the performing operations on the transformed input data and parameter matrices may further include: activation function operations or pooling operations.

As an alternative example, the operation device may include an internal storage unit. Instructions stored in the internal storage unit can be used for completing training of an accelerated neural network or for testing operation. When the operation device processes data during a testing, the operation device can transfer input to the neural network to obtain a forward result through the operation module.

During a training process, an input may be repeatedly transferred to a neural network, the operation module may perform operations to obtain a forward result, and during the process, the forward operation result may be compared with a given reference result to obtain an error, then a gradient is operated and back propagated to an input terminal of the neural network, and neural network parameters may be updated during each forward process or every couple of forward processes.

Specifically, a forward operation process in the above-mentioned process may include:

S1, transferring input into the neural network;

S2, processing input data by a neural network layer through the operation module, where the processing process may include, but is not limited to convolution, down-sampling, normalization, regularization, and the like, and the corresponding layers are convolutional layer, down-sampling layer, normalization layer, and regularization layer;

S3, collecting output results and transferring the results.

Figure 25:
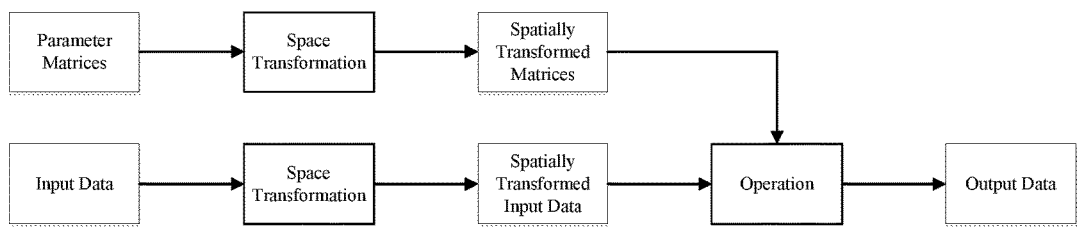
FIG. 25 is a diagram showing a process of an operation device in an example of the disclosure performing the operations of a layer.

FIG. 25 is a diagram showing a process of an operation device provided in an example of the disclosure performing operations of a layer. The process may include:

Step 1: performing spatial transformation on input data by transforming the input data from first geometric space to second geometric space. Specifically, the input data may be transformed from spatial domain to another geometric space, for instance, from a spatial domain to a frequency domain. A manner adopted for spatial transformation may be invertible space transformation, such as FFT (Fast Fourier Transform), DFT (Discrete Fourier Transform), DCT (Discrete Cosine Transform), DST (Discrete Sine Transform), and the like. Representing raw data by a linear combination of another geometric space basis vector, which in other words, refers to expanding the raw data in another geometric space. In a neural network operation, the input data may include neurons.

Step 2: performing spatial transformation on parameter matrices by transforming the parameter matrices from the first geometric space to the second geometric space. Specifically, the parameter matrices may be transformed from a spatial domain to another geometric space, for instance, from a spatial domain to a frequency domain. A manner adopted for spatial transformation may be invertible space transformation, such as FFT, DFT, DCT, DST, and the like. Representing raw data by a linear combination of another geometric space basis vector, which in other words, refers to expanding the raw data in another geometric space. This spatial transformation may be similar to the above-mentioned spatial transformation, in a neural network operation, the parameter matrices may include weights.

Obtaining an expression of the parameter matrices in the transformation space according to the transformed parameter matrices, which in other words, refers to representing the parameter matrices by using a mathematical expression in the transformation space.

Performing further operations on the transformation result and the transformed parameter matrices according to the transformation result of the input data obtained in Step 1, and obtaining an initial operation result corresponding to the input data.

Correspondingly, when using the above-mentioned operation device to perform convolution operations in a forward process, the following may be included: Performing spatial transformation on input data by transforming the input data from a spatial domain to another space, for instance, a frequency domain. A manner adopted for spatial transformation may be invertible space transformation, such as DFT, DCT, and DST.

Performing spatial transformation on parameter matrices of the convolutional layer by transforming the parameter matrices from a spatial domain to another space, for instance, a frequency domain. The space may be the same as the space in the first step.

Obtaining a linear combination expression of the parameter matrices in the transformation space according to the transformed parameter matrices, which in other words, refers to representing the parameter matrices as a linear combination of the space basis vector of the transformation space.

Performing operations on the transformation result of the input data and the transformed parameter matrices (in other words, a linear combination expression of the parameter matrices) to obtain an initial convolution operation result corresponding to the input data according to the transformation result of the input data obtained in the first step, which in other words, refers to that the input data is expanded in the second geometric space and expressed by a linear combination expression of the second geometric space basis vector.

Figure 26:
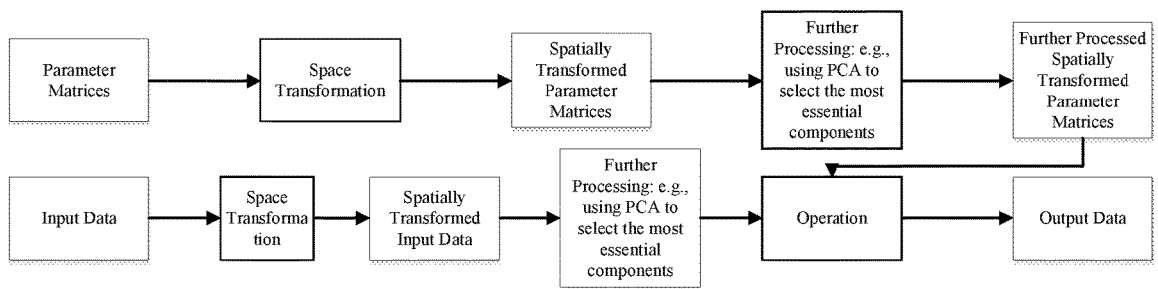
FIG. 26 is a diagram showing an operation module in an example of the disclosure performing neural network operations.

As an alternative example, as shown in FIG. 26, parameter matrices and input data may be further optimized in the transformation space. Optionally, optimization may be performed by analyzing components, and a further acceleration may thus be realized. Specifically, after input data and parameter matrices are spatially transformed, expressions of the input data and parameter matrices may include a plurality of components and corresponding coefficients of the components. A component selection may be performed according to a component selection condition through PCA to select some essential components, and other unessential components may be deleted. In addition, besides PCA, other customized analyses may be used for optimization. The component selection condition may include a threshold condition. For instance, with a given threshold, if the absolute value of the coefficient of a component is greater than the threshold, the component may be retained; otherwise, if the absolute value of the coefficient of a component is less than the threshold, the component may be deleted. The component selection condition may further include a quantity condition. For instance, with a given quantity for selection, components that satisfy the quantity may be selected according to the coefficients of the components that are sorted in descending order. The further optimization may be optional for both parameter matrices and input data. Other applicable further optimization may include, but is not limited to, quantifying, which in other words, refers to a process of approximating continuous values (or a large count of possible discrete values) of a signal as a limited plurality of (or a small count of) discrete values; sparsification; and compressing.

Figure 27:
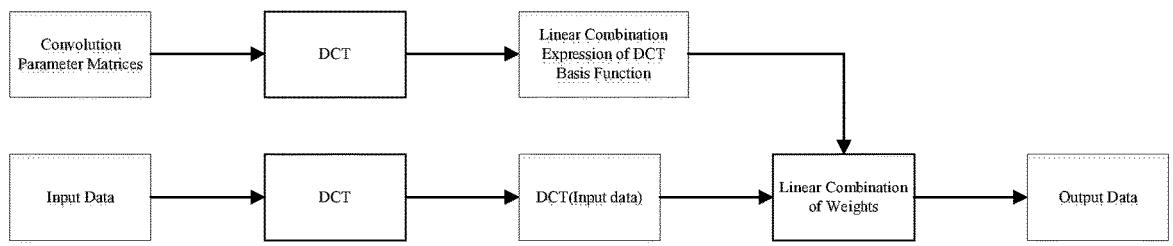
FIG. 27 is a diagram showing an operation module in an example of the disclosure performing convolution operations.

As an alternative example, as shown in FIG. 27, when an operation is a convolution operation, a spatial transformation manner adopted may be DCT. In this example, a convolution kernel and input data may not be further optimized in terms of a transformed spatial representation.

Figure 28:
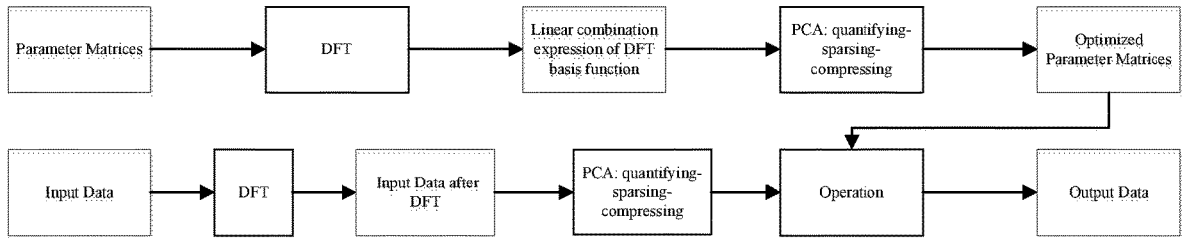
FIG. 28 is a diagram showing an operation module in an example of the disclosure performing convolution operations.

As an alternative example, as shown in FIG. 28, when an operation is a convolution operation, a spatial transformation manner adopted may be DFT. Optimization processing in the example may be: firstly, selecting essential space components through PCA to approximately express raw data, where data processed in this stage may include input data and weights, and then quantifying, sparsifying, and compressing the data to further reduce an amount of operations and an amount of data to be stored.

In some other examples, spatial transformation may be customized spatial transformation as long as it meets criteria of an invertible orthogonal transformation.

Alternatively, the operation device above can perform spatial transformation on matrices to be operated.

Alternatively, the transformation module of operation device may perform winograd transformation on neuron matrices and weight matrices to obtain transformed neuron matrices and transformed weight matrices.

Alternatively, the following formula may be used for performing winograd transformation on neuron matrix d0 and weight matrix w0, to obtain transformed neuron matrix d and transformed weight matrix w:

$$d = C^T d_0 C, \quad w = G w_0 G^T,$$

where C represents a transformation matrix of the neuron matrix d0, CT represents a transposition matrix of C, G represents a transformation matrix of the weight matrix w0, and GT represents a transposition matrix of G.

Besides, numbers in neuron matrices and weight matrices may be binary, and numbers of the transformation matrices C and G may be $2^n$, for instance, 1, −0.5, 0, 0.5, 1, and the like. In this way, the present example of the disclosure may adopt bit manipulation to realize winograd transformation, where operations of multiplying by 2 and dividing by 2 may be realized by left shift and right shift. For instance, when a number in the neuron matrix d0 is multiplied by 0.5, the number may be right shifted by one position; when a number in neuron matrix d0 is multiplied by −0.5, the number may be left shifted by one position and a most significant digit may be negated. In this way, the present example of the disclosure may realize winograd transformation by bit manipulation, operation amount may thus be reduced, and operation speed may thus be improved.

The transformation matrices C and G of the neuron matrix d0 and weight matrix w0 may be obtained by using a winograd algorithm.

A winograd algorithm may use blocks of a matrix to perform multiplication so as to reduce matrix multiplication. There are a plurality of different manners to partition a matrix into blocks. A winograd algorithm is as follows:

performing matrix multiplication C=AB, and partitioning each matrices into blocks, then $$A = \begin{bmatrix} A_{11} & A_{12} \\ A_{21} & A_{22} \end{bmatrix}, B = \begin{bmatrix} B_{11} & B_{12} \\ B_{21} & B_{22} \end{bmatrix}, C = \begin{bmatrix} C_{11} & C_{12} \\ C_{21} & C_{22} \end{bmatrix}$$

noting down $$S_1 = A_{21} + A_{22}, \ S_2 = S_1 - A_{11}, \ S_3 = A_{11} - A_{21}, \ S_4 = A_{12} - S_2$$

$$S_5 = B_{12} - B_{11}, \ S_6 = B_{22} - S_5, \ S_7 = B_{22} - B_{12}, \ S_8 = S_6 - B_{21}$$

$$M_1 = S_2 S_6, \ M_2 = A_{11} B_{11}, \ M_3 = A_{12} B_{21}, \ M_4 = S_3 S_7$$

$$M_5 = S_1 S_5, \ M_6 = S_4 B_{22}, \ M_7 = A_{22} S_8$$

$$T_1 = M_1 + M_2, \ T_2 = T_1 + M_4$$

then $$C_{11} = M_2 + M_3 + M_6, \ C_{12} = T_1 + M_5$$

$$C_{21} = T_2 - M_7, \ C_{22} = T_2 + M_5$$

obtaining transformation matrix required by a convolution through the winograd algorithm, instance for, for a one-dimension convolution $[d_1, d_2, d_3] * [w_1, w_2]$ assuming that each convolution sliding is 1, then expanding the convolution into a form of matrix multiplication $$\begin{bmatrix} d_1, d_2 \\ d_2, d_3 \end{bmatrix} \begin{bmatrix} w_1 \\ w_2 \end{bmatrix} = \begin{bmatrix} output_1 \\ output_2 \end{bmatrix}$$

the following can be obtained through the winograd algorithm $$M_1 = (-a_1 + a_2 + a_3) b_1, \ M_2 = a_1 b_1, \ M_3 = a_2 b_2, \ M_4 = 0$$

$$M_5 = (a_2 + a)(-b_1), \ M_6 = 0, \ M_7 = a_3 (b_1 - b_2)$$

$$output_1 = M_2 + M_3 + M_6, \ output_2 = M_1 + M_2 + M_4 - M_7$$

removing items whose value are 0 along with unused items, then rewriting the above as $$m_1 = (-a_1 + a_2 + a_3) b_1, \ m_2 = a_1 b_1, \ m_3 = a_2 b_2, \ m_4 = a_3 (b_1 - b_2)$$

$$output_1 = m_2 + m_3, \ output_2 = m_1 + m_2 - m_4$$

in this way, a transformation matrix of the convolution can be obtained $$C = \begin{bmatrix} -1 & 1 & 0 & 0 \\ 1 & 0 & 1 & 0 \\ 1 & 0 & 0 & 1 \end{bmatrix}, G = \begin{bmatrix} 1 & 0 \\ 1 & 0 \\ 0 & 1 \\ 1 & -1 \end{bmatrix}, A = \begin{bmatrix} 0 & 1 \\ 1 & 1 \\ 1 & 0 \\ 0 & 1 \end{bmatrix}$$

For a high dimensional matrix, a convolution transformation matrix of the matrix may be obtained through a plurality times of matrix partitioning. A winograd algorithm may provide different manners for dividing a matrix into blocks. For the same manner of dividing a matrix into blocks, specific numbers and dimension of a transformation matrix may be determined according to dimensions of input neurons and a weight matrix as well as a convolution sliding stride.

The operation module of operation device in the foregoing example may be CPU, GPU, FPGA, DSP, and an ASIC dedicated accelerator.

Besides, it should be noted that a neural network of the present disclosure may include, but is not limited to a convolution neural network, and may also be a fully connected neural network, a RBM neural network, a Recurrent Neural Network, and the like.

As an alternative example, the operation device and method provided in any of the foregoing examples may be used for other operations in addition to a convolution operation, such as a fully connected operation.

It should be noted that the related device and method provided in the present disclosure may be implemented in other manners. For instance, the above-mentioned examples of device are merely illustrative, For instance, the modules or units are divided only according to logical functions, and they may be divided in other manners in practical implementations. For another instance, a plurality of units or components may be combined or integrated into another system, or some characteristics may be omitted or not be performed. Another example provides a combined processing device that may include the above-mentioned data processing device and method. The data processing device may be connected to another processing devices via a generic interconnection interface. The data processing device may communicate with other processing devices to jointly complete a user-specified operation.

The other processing devices may include one or more types of processors of generic/dedicated processors such as a CPU (Central Processing Unit), a GPU (Graphics Processing Unit), a neural network processor, and the like. A count of processors included in the other processing devices is not confined. The other processing devices may act as interfaces between a neural network operation device, external data, and controls, and perform data transferring and basic control on the neural network operation device such as turning on and shutting down the device; and the other processing devices may also cooperate with the neural network operation device to jointly complete an operation task.

The generic interconnection interface may be configured to transfer data and control instructions between the neural network operation device and the other processing devices. The neural network operation device may obtain required input data from the other processing devices and write the input data in an on-chip storage device of the neural network operation device; the neural network operation device may also obtain control instructions from the other processing devices and write the control instructions in an on-chip control caching unit of the neural network operation device; and the neural network operation device may further read data in the storage module of the neural network operation device and transfer the data to the other processing devices.

Alternatively, the structure may further include a storage device. The storage device may be connected to the data processing device and the other processing devices respectively. The storage device may be configured to store data in the data processing device and the other processing devices, and may be particularly suitable for a case where all data to be operated cannot be stored in an internal storage of the data processing device or the other processing devices.

The combined processing device may be used as a SOC (System on Chip) for devices such as mobile phones, robots, drones, video surveillance devices to effectively reduce a core area of a control section, increase processing speed, and cut down overall power consumption. In this case, the generic interconnection interface of the combined processing device may be connected to some components of the device such as a camera, a display, a mouse, a keyboard, a network interface card, and a Wi-Fi interface.

It should be noted that, for the foregoing examples of method, for the convenience of description, the example are described as a series of action combinations, but those skilled in the art should note that, the present disclosure is not limited by the described action sequence, which is due to that fact that some steps may be performed in other orders or may be performed simultaneously according to the present disclosure. In addition, those skilled in the art should further note that, the examples described in the specification are all alternative examples, and the actions and modules involved are optional rather than compulsory The above-mentioned examples are described with different focuses, and some parts that are not described in details in an example can be found in related description in other examples.

In the several examples provided in the present disclosure, it should be understood that the disclosed device may be implemented in other ways. For instance, the examples device described above are merely illustrative. For instance, division of the units is merely based on logical functions. In actual implementations, there may be other manners of division. For instance, a plurality of units or components may be combined or integrated into another system, or some characteristics may be omitted or not be performed. In addition, intercoupling, direct coupling, or communication connection that are shown or discussed may be indirect coupling or communication connection through some interfaces, devices, or units, and may be in an electrical form or other forms.

The units described as separate components may or may not be physically separated, and components presented as units may or may not be physical units; in other words, they may be located in the same place, or may be distributed to a plurality of network units. Some or all of the units may be selected according to actual needs to realize the purposes of the technical solution of the examples.

In addition, the respective functional units in the respective examples of the present disclosure may be integrated into one processing unit, or each unit may exist in a physically independent manner, or two or more units may be integrated in one unit. The above-mentioned integrated unit can be implemented in a form of hardware or in a form of a software program module.

The integrated unit, if being implemented in a form of a functional software unit and sold or used as a standalone product, may be stored in a computer readable memory. Based on such understanding, the essence of the technical solution of the present disclosure or the part of the technical solution which makes a contribution to the prior art or the whole or part of the technical solution may be embodied in a form of a software product. The computer software product may be stored in a memory which may include a count of instructions for causing a computer device (which may be a personal computer, server, or network device, etc.) to perform all or some of the steps of the method described in the respective examples of the present disclosure. The above-mentioned memory may include various media that can store program codes, such as USB stick, Read-Only Memory (ROM), Random Access Memory (RAM), removable hard disk, magnetic disk, CD, and the like.

It can be understood by those skilled in the art that the whole or some of the steps of the methods in the above examples may be realized by a computer program instructing related hardware, and the computer program may be stored in a computer readable memory, where the memory may include: flash disk, Read-Only Memory (ROM), Random Access Memory (RAM), magnetic disk, CD, and the like.

Examples of the present disclosure have been described above in detail, and specific instances are used herein to illustrate the principles and implementations of the present disclosure, which are only used for facilitating understanding of the methods and concepts of the present disclosure; meanwhile, for those skilled in the art may make modifications to specific examples and application scope based on the spirit or scope of the present disclosure, therefore, the content of the specification should not be construed as limitations on the present disclosure.

The technical characteristics of the above-mentioned examples may be randomly combined. For the sake of brevity of description, not all possible combinations of the technical characteristics of the above-mentioned examples are described. However, as long as there is no contradiction in the combinations of these technical characteristics, all possible combinations should be considered as falling within the scope of the specification.

The above-mentioned examples merely describe several implementations of the disclosure. It should be understood that the description of the examples, while being relatively specific and detailed, are not given by way of limitation on the scope of the disclosure. It should be noted that, those skilled in the art may make changes and modifications without departing from the disclosure in its broader aspects, which all fall within the scope of protection of the disclosure. Therefore, the protection scope of the disclosure should be subject to the protection scope of the claims.

What is claimed is:

1. An operation device comprising:
an operation module comprising one or more operation units; and
a control module comprising an operation control unit configured to disable at least one of the one or more operation units according to a determination condition,
wherein a multiplier of each of the one or more operation units includes three input terminals and one output terminal,
wherein two of the three input terminals of the multiplier are configured to receive neuron data and synaptic data respectively,
wherein one of the three input terminals of the multiplier is configured to input control signals, and wherein the output terminal of the multiplier is configured to output results of multiplication, wherein an adder of each of the one or more operation units includes three input terminals and one output terminal, wherein two of the three input terminals of the adder are configured to receive results of multiplication and data input by a temporary caching unit, wherein one of the three input terminals of the adder is configured to input control signals, and the output terminal of the adder is configured to output results of addition, wherein the results of addition are stored back into the temporary caching unit and are used as input data of a next stage for addition.

2. The operation device of claim 1, wherein each of the one or more operation units includes a temporary caching unit and one or more operation components, and the operation components include one or more of adder, multiplier, or selector.

3. The operation device of claim 2, wherein the operation module includes n multipliers located at a first stage and an adder tree of n input located at a second stage, wherein n represents a positive integer.

4. The operation device of claim 1,
wherein the determination condition includes a threshold determination condition or a function mapping determination condition,
wherein the determination condition is a threshold determination condition including: being less than a given threshold, being greater than a given threshold, being within a given value range, or being outside a given value range, and
wherein the determination condition determines whether a given condition is satisfied after a function transformation is performed.

5. The operation device of claim 3, wherein then multipliers located at the first stage are connected to the operation control unit, and the operation control unit is configured to disable the multipliers according to the given determination condition.

6. The operation device of claim 5, wherein the adder tree includes k stages of adders, wherein a count of adders of a first stage is n/2, a count of adders of a final stage, which is a $k^{th}$ stage, is 1, wherein 2k=n, the n/2 adders of the first stage of the adder tree are connected to the n multipliers respectively to receive data signals and control signals sent by the multipliers, adders of a second stage to the $k^{th}$ stage of the adder tree are connected to adders of a previous stage respectively to receive data signals and control signals sent by adders located at the previous stage.

7. The operation device of claim 5, wherein, if a multiplier receives a shutdown signal from the operation control unit, a control signal 0 is input into an adder of a first stage of the adder tree, otherwise, a product is transferred to the adder of the first stage of the adder tree and a control signal 1 is input to the adder of the first stage, if an adder receives two control signals 1, input values are accumulated, and an accumulation result is transferred to an adder of a next stage and a control signal 1 is sent to the next stage, if an adder receives a control signal 1 and a control signal 0, input data of a side that receives the control signal 1 are sent directly to an adder of a next stage and a control signal 1 is sent to the adder of the next stage, if an adder receives two control signals 0, the adder is shut down and a control signal 0 is sent to an adder of a next stage, the rest can be done in the same manner until the adder tree obtains a final result by accumulating.

8. The operation device of claim 3, wherein the n multipliers located at the first stage and the adder tree of n input located at the second stage are connected to the operation control unit respectively, the operation control unit is configured to perform a determination on data to be operated according to the determination condition, and when the operation control unit determines that absolute values of input data that are input into a multiplier or an adder are less than a given threshold, a corresponding multiplier or adder is shut down.

9. The operation device of claim 3,
wherein the operation device further includes a data processing module that is configured to expand or compress data, and correspondingly, the control module includes a data control unit that is configured to control the data processing module to expand or compress data,
wherein the data processing module is configured to expand and compress data, if synaptic values are in a sparse mode, which refers to a sparse network represented by sparse encoding, the data processing module is configured to compress neuron data according to sparseness of the synaptic values, and compress and screen out neuron data that need not be operated, or, if neuron data are in a sparse mode, the data processing module is configured to compress synapses according to sparseness of the neuron data, compress and screen out synaptic data that need not be operated, or, according to a given compression determination condition, the data processing module is configured to compress synapses and/or neuron data,
wherein the compression determination condition includes a threshold determination condition or a function mapping determination condition,
wherein the threshold determination condition includes: being less than a given threshold, being greater than a given threshold, being within a given value range, or being outside a given value range.

10. The operation device of claim 9, wherein the n multipliers of the first stage are connected to the data processing module respectively for receiving neuron data and synaptic data that are output by the data processing module.

11. The operation device of claim 1, wherein the operation module includes m operation units, wherein each of the operation units includes one multiplier, one adder, and one temporary caching unit,
the control module includes m operation control units, wherein each of the operation control units is connected to a multiplier and an adder of an operation unit respectively, and each of the operation control units is configured to control the shutdown of a corresponding multiplier and a corresponding adder according to the determination condition, wherein m represents a positive integer.

12. The operation device of claim 1, wherein synaptic data are sent to each of the operation units by broadcasting, if neuron data that are input into an operation unit are less than a threshold, a control signal controls a multiplier and an adder of the operation unit to shut down, and a partial sum that is stored in the temporary caching unit remains unchanged, if neuron data that are input into an operation unit are not less than the threshold, the multiplier in the operation unit is used for multiplying two data that are input into the multiplier, a product and data stored in the temporary caching unit is accumulated, and an accumulation result is stored in the temporary caching unit.

13. The operation device of claim 12, wherein the operation device further includes a data processing module and a storage module, wherein an input terminal of the multiplier is connected to the data processing module for receiving compressed synaptic data, and an input terminal of the multiplier is connected to the storage module for receiving neuron data.

14. The operation device of claim 1, wherein the operation module includes p operation units, wherein each of the operation units includes a multiplier, an adder, and a selector,
the control module includes p operation control units, wherein each of the operation control units is connected to a multiplier and an adder of an operation unit respectively, and is configured to control the shutdown of the multiplier and the adder according to the determination condition, wherein p represents a positive integer.

15. The operation device of claim 14, wherein a multiplier of each of the operation units has three input terminals and one output terminal, wherein two input terminals are configured to receive neuron data and synaptic data, one input terminal is configured to input control signals, and the output terminal is configured to output results of multiplication,
an adder of a first operation unit has three input terminals and one output terminal, wherein two input terminals are configured to receive results of multiplication and data input by a selector of a current stage respectively, and one input terminal is configured to input control signals, and the output terminal is configured to output results of addition, wherein the results of addition are sent to a next operation unit through a selector for serving as input data of addition operation performed at a next stage,
an adder of a second to a pth operation unit has three input terminals and one output terminal, two input terminals are configured to receive results of multiplication and data input by a selector of a previous stage respectively, one input terminal is configured to input control signals, and the output terminal is configured to output results of addition, wherein the results of addition are sent to a next operation unit through a selector for serving as input data of addition operation performed at a next stage.

16. The operation device of claim 1,
wherein the operation device further includes:
a storage module which is connected to the control module, and is configured to control the storage module to store or read required data, the storage module is also connected to the operation module for inputting data to be operated into the operation module, receiving and storing data operated by the operation module, and
wherein the control module includes a storage control unit, wherein the storage control unit is configured to control the storage module to store or read required data.

17. An operation method comprising:
setting a determination condition; and
disabling an operation unit of an operation module according to the determination condition,
wherein a multiplier of the operation unit includes three input terminals and one output terminal,
wherein two of the three input terminals of the multiplier are configured to receive neuron data and synaptic data respectively,
wherein one of the three input terminals of the multiplier is configured to input control signals, and
wherein the output terminal of the multiplier is configured to output results of multiplication,
wherein an adder of the operation unit includes three input terminals and one output terminal,
wherein two of the three input terminals of the adder are configured to receive results of multiplication and data input by a temporary caching unit,
wherein one of the three input terminals of the adder is configured to input control signals, and the output terminal of the adder is configured to output results of addition,
wherein the results of addition are stored back into the temporary caching unit and are used as input data of a next stage for addition.

18. The operation method of claim 17,
wherein the determination condition includes a threshold determination condition or a function mapping determination condition,
wherein the determination condition is a threshold determination condition including: being less than a given threshold, being greater than a given threshold, being within a given value range, or being outside a given value range, and
wherein the determination condition is a function mapping determination condition, which in other words, is to determine whether a given condition is satisfied after a function transformation is performed.

19. An electronic device, comprising:
an operation device that includes:
an operation module comprising one or more operation units; and
a control module comprising an operation control unit configured to disable at least one of the one or more operation units according to a determination condition,
wherein a multiplier of each of the one or more operation units includes three input terminals and one output terminal,
wherein two of the three input terminals of the multiplier are configured to receive neuron data and synaptic data respectively,
wherein one of the three input terminals of the multiplier is configured to input control signals, and
wherein the output terminal of the multiplier is configured to output results of multiplication,
wherein an adder of each of the one or more operation units includes three input terminals and one output terminal,
wherein two of the three input terminals of the adder are configured to receive results of multiplication and data input by a temporary caching unit,
wherein one of the three input terminals of the adder is configured to input control signals, and the output terminal of the adder is configured to output results of addition,
wherein the results of addition are stored back into the temporary caching unit and are used as input data of a next stage for addition.

* * * * *